United States Patent
Simons et al.

(10) Patent No.: US 9,569,737 B2
(45) Date of Patent: Feb. 14, 2017

(54) METHODS AND TOOLS FOR CREATING AND EVALUATING SYSTEM BLUEPRINTS

(75) Inventors: Suzanne Barber Simons, Austin, TX (US); Thomas Jeffrey Graser, Austin, TX (US)

(73) Assignee: Aware Software, Inc., Austin, TX (US)

( * ) Notice: Subject to any disclaimer, the term of this patent is extended or adjusted under 35 U.S.C. 154(b) by 1328 days.

(21) Appl. No.: 11/891,813

(22) Filed: Aug. 13, 2007

(65) Prior Publication Data

US 2008/0046299 A1 Feb. 21, 2008

Related U.S. Application Data

(60) Provisional application No. 60/838,071, filed on Aug. 16, 2006.

(51) Int. Cl.
*G06Q 10/00* (2012.01)
*G06Q 10/06* (2012.01)

(52) U.S. Cl.
CPC .......... *G06Q 10/06* (2013.01); *G06Q 10/0639* (2013.01); *G06Q 10/06313* (2013.01); *G06Q 10/06315* (2013.01)

(58) Field of Classification Search
CPC ......... G06Q 10/00; G06Q 40/00; G06Q 17/00
USPC ........................................................ 705/7.11
See application file for complete search history.

(56) References Cited

U.S. PATENT DOCUMENTS

| | | | |
|---|---|---|---|
| 6,018,627 A * | 1/2000 | Iyengar et al. | 717/103 |
| 6,167,564 A * | 12/2000 | Fontana et al. | 717/104 |
| 6,405,364 B1 * | 6/2002 | Bowman-Amuah | 717/101 |
| 6,581,040 B1 * | 6/2003 | Wright et al. | 705/7.23 |
| 7,047,518 B2 * | 5/2006 | Little et al. | 717/108 |
| 7,162,427 B1 * | 1/2007 | Myrick et al. | 705/1 |
| 7,346,529 B2 * | 3/2008 | Flores | 705/7 |
| 7,685,013 B2 * | 3/2010 | Gendler | 705/7.23 |
| 7,849,438 B1 * | 12/2010 | Hemmat et al. | 717/102 |
| 7,937,281 B2 * | 5/2011 | Miller | G06Q 10/06 705/7.12 |
| 8,190,399 B1 * | 5/2012 | Anderson et al. | 703/1 |
| 8,290,806 B2 * | 10/2012 | Lee et al. | 705/7.23 |
| 8,412,618 B2 * | 4/2013 | Robertson et al. | 705/37 |
| 8,688,596 B2 * | 4/2014 | Mueller | 705/321 |

(Continued)

OTHER PUBLICATIONS

Lofnertz, Per; Ericsson, Maria. "Repeatable RUP deployments via solution components". May 2003. The Rational Edge.*

(Continued)

*Primary Examiner* — Romain Jeanty
(74) *Attorney, Agent, or Firm* — Meyertons, Hood, Kivlin, Kowert & Goetzel, P.C.; Eric B. Meyertons

(57) ABSTRACT

Method and tools for creating and evaluating a set of system blueprints pertaining to the delivery of a system or a project. Each blueprint is an architecture design/specification that enables analysis of each blueprint, families of blueprints and relationships between blueprint layers. A user can create various system blueprints based on data from existing databases containing requirements, solutions, and deployments of a system or project. After creating each blueprint, users may view the blueprint to visually detect problems and further revise the blueprint. In addition, for each type of blueprint, the user can evaluate the blueprint against various metrics and criteria related to requirements, solutions, and deployments and view the evaluation results.

26 Claims, 12 Drawing Sheets

(56) References Cited

U.S. PATENT DOCUMENTS

| | | | |
|---|---|---|---|
| 8,756,091 B2* | 6/2014 | Simons et al. | 705/7.23 |
| 2005/0021348 A1* | 1/2005 | Chan et al. | 705/1 |
| 2006/0136179 A1* | 6/2006 | Sit | 703/1 |
| 2006/0242003 A1* | 10/2006 | Yaskin et al. | 705/11 |

OTHER PUBLICATIONS

Zangaglia, Paul. "Business Intelligence Deployment Strategies: A Pragmatic Pattern-Based Approach". 3rd Quarter 2006. Business Intelligence Journal.*

Woodhill "Planning, Monitoring and Evaluating Programmes and Projectse", Mar. 2000, Introduction to PM&E Concepts, Approaches and Terms Working Draft Version 1. pp. 1-36.*

Graser, T.; Barber, K.S.; "Systematic Derivation and Evaluation of Domain-Specific, Implementation-Independent Software Architiectures"; Nov. 15, 2006.

Holt, James Carrell; "Evaluation of Dynamic Properties of Software Architectures Using Software Architecture Execution"; Dissertation; May 2003.

Ahn, Jaesuk; Gujral, Nishit; Lam, Dung; "An Architectural Model for Designing Agent-Based Systems"; Journal Paper.

Gujral, Nitshit; Ahn, Jaesuk; Barber, K. Suzanne; "Architectural Model for Designing Agent-based System".

Graser, Thomas Jeffrey; Reference Architecture Representation Environment: Systematic Derivation and Evaluation of Domain-Specific, Implementation-Independent Software Architectures; Dissertation; May 2001.

PCT Application No. PCT/US2007/76040, Search Report and Written Opinion mailed Jul. 30, 2008.

PCT Application No. PCT/US2007/76042, Search Report and Written Opinion mailed Sep. 5, 2008.

* cited by examiner

METHODS AND TOOLS FOR CREATING AND EVALUATING SYSTEM BLUEPRINTS

CROSS-REFERENCE TO RELATED APPLICATIONS

This application claims the benefit of provisional application Ser. No. 60/838,071, filed Aug. 16, 2006, entitled "Method and Tools to Support Strategic Decision Making by Specifying, Relating, and Analyzing Requirements, System Designs, and System Deployments"—the contents of such application being hereby incorporated by reference.

The application is related to application Ser. No. 11/891,155, now U.S. Pat. No. 8,160,913 filed Aug. 9, 2007, entitled "Method and Tools to Support Strategic Decision Making by Specifying, Relating, and Analyzing Requirements, Solutions, and Deployments"—the content of which is hereby incorporated by reference.

STATEMENT REGARDING FEDERALLY SPONSORED RESEARCH

Not applicable.

REFERENCE TO SEQUENCE LISTING OR A COMPUTER PROGRAM LISTING

None.

BACKGROUND OF THE INVENTION

1. Field of the Invention

The present invention relates generally to the design, evaluation, and delivery of complex systems and projects. More particularly, embodiments of the invention relate to methods and tools for creating and evaluating various system blueprints based on the requirements, solutions, and deployments of complex systems and projects.

2. Background Art

In the delivery of complex systems and projects, decision-makers (e.g. project planners, managers and technical leads) are often confronted with a large number of decisions and decision dependences/constraints when planning, designing, building, buying or deploying the complex system. For example, these decision-makers must: (a) determine the scope and detail of requirements to capture, document and measure the system by; (b) predict and assess individual customers or market needs at given times, available technology solutions, and the overall requirements for the system including functional requirements, data requirements, timing requirements, non-functional requirements, and installation requirements; (c) identify and plan for the scope of requirements to be delivered and satisfied within respective system releases and system deployments; (d) evaluate and compare technology solutions options; (e) determine which technology solutions to buy, reuse, or develop; (f) configure, evaluate and select technology solutions that best satisfy: functional requirements, compatibility/integration with each other, non-functional requirements, marketplace needs or the limits of the customer's actual resources.

Prior requirements and design tools mostly target technology-savvy users involved in tactical decision-making associated with system development activities. These independent and isolated software tools are intended to facilitate a particular aspect of the decision making process (e.g., organize text fragments to describe requirements and relate the text fragments to requirements). In some cases, users (e.g., system architect) can use some tools to draw elaborate diagrams using standardized notations (e.g., UML) describing modules/components/parts of a system and relating those parts in timing diagrams, data flow diagrams, topology diagram, etc. These prior tools target detailed designs and development and assume the output of high-level strategic decision-making as a given input. All analyses and evaluations of: (1) requirements, solutions, and deployments, (2) dependencies between requirements, solutions and deployments as well as (3) associated designs or blueprints are left to the human users' cognitive processes. Since these prior systems target technical staff (i.e., developers), they focus on requirements or low level design and do not consider the system and business view or allow a user to create descriptions of requirements or designs/blueprints or relate/link the requirements, solutions and deployments to customers.

Furthermore, despite incomplete requirements, solution specifications and deployment descriptions, the earlier decision-makers are provided this information and the ability to conduct trade-offs and evaluations, the earlier problems can be detected and costly problems can be avoided where problems become more and more costly at each step in the project lifecycle (e.g. project analysis, design, development, testing, deployment, maintenance).

Therefore, there is a need to provide methods and software tools, including computational models and analysis logic, to enable decision-makers to: (a) manage large, complex, and sometimes conflicting sets of information and decisions; (b) manage and relate/link large amounts of complex associations between requirements, solutions and deployments of a complex system; and (c) evaluate and conduct trade-offs for different designs, blueprints, solutions, and milestones for the delivery of a complex system.

BRIEF SUMMARY OF THE INVENTION

To improve the decision making process for the delivery of complex systems, the present invention provides decision makers with three-layered system blueprints: (1) Business Blueprints capturing a set of business requirements, (2) Solution Blueprints capturing a configuration of solutions, and (3) Deployment Blueprints describing delivery and installation of a solution configuration specified in the associated Solution Blueprint. Each blueprint is an architecture design/specification that enables analysis of each blueprint, families of blueprints and relationships between blueprint layers.

The present invention allows a user to create various system blueprints based on data from existing databases containing requirements, solutions, and deployments for a particular complex system or project. First, the user creates a Business Blueprint from the existing requirements database. Next, using the Business Blueprint, the user can create one or more Solution Blueprints based on the solutions in the existing solutions database to satisfy the requirements in the Business Blueprint. Third, the user uses each Solution Blueprint to create one or more Deployment Blueprint based on deployment platforms and milestones in the existing deployment database for the deployment and delivery of the selected solutions. After creating each blueprint, users may view the blueprint to visually detect problems and further revise the blueprint. In addition, for each type of blueprint, the user can evaluate the blueprint against various metrics and criteria related to requirements, solutions, and deployments.

An object of the present invention is to allow users to evaluate blueprints with a specific set of analytical modules at each blueprint level. In particular, Business Blueprints may be evaluated for such properties as integration, performance, reliability, completeness, reusability, and flexibility. Solution Blueprints may be evaluated with respect to a parent Business Blueprint for performance, reliability, and compliance with requirements in the Business Blueprint. Deployment Blueprints may be evaluated with respect to a parent Solution Blueprint for compatibility and sufficiency of resources in terms of memory, operating system (OS), commercial off the shelf software (COTS), and connectivity. Users may view the evaluation results of blueprints graphically on a user interface or as a report. Detected problems can be fixed manually, automatically, or semi-automatically with the help of this present invention.

Recognizing that there is no one "perfect" blueprint, another object of the present invention is to enable strategic tradeoffs to be made to provide the right analysis at the right level of detail to make those decisions. To that end, embodiments of the present invention, using the various evaluation modules, provide a consistent view to a range of distributed stakeholders about (a) the functional scope for a respective release (termed the Business Blueprint Release), (b) how well the Business Blueprint Release meets expectations for system qualities, schedule, budget, performance, etc., (c) possible solution configurations for a particular Business Blueprint Release, (d) how well each solution configuration meets given expectations, (e) how well solution configurations can be integrated and installed within marketplaces or within the physical environment at the customer site(s), and (f) how well the Deployment Blueprint meets expectations.

The present invention provides advantages and creates value to all stakeholders (such as managers, technical leaders, and planners) by allowing stakeholders distributed by expertise and geography to be on the same page about the functional and technical direction and scope for each project; in particular, embodiments of the invention provide stakeholders with (a) blueprint quality evaluations across multiple blueprints, families of blueprints and blueprint layers, (b) graphical depictions of blueprints and evaluation results at multiple levels of abstraction, (c) what-if/trade-off analyses within a respective blueprint, between "families" of blueprints such as a family of Solution Blueprints derived from the same Business Blueprint Release, or across the different types of Blueprints, (d) blueprint derivation guidance along multiple dimensions, e.g. layers, concerns, and (e) documented rationale for decisions, so they can make informed strategic decisions, identify and solve early problems, increase productivity, and facilitate the success of a project.

Other important objects and technical advantages are readily apparent to one skilled in the art from the following figures, descriptions, and claims.

BRIEF DESCRIPTION OF THE SEVERAL VIEWS OF THE DRAWINGS

The present invention will become more clearly appreciated as the disclosure of the present invention is made with reference to the accompanying drawings wherein.

Like elements in the various figures are denoted by like reference numerals for consistency.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriated arts may modify the invention here described while still achieving the favorable results of this invention. Accordingly, the description that follows is to be understood as being broad, teaching disclosure directed to persons of skill in the appropriate arts, and not as limiting upon the present invention.

OVERVIEW OF THE PRESENT INVENTION

In accordance with the present invention, a blueprint is an architecture specification or design represented by computational model(s) that enables automated analysis of each blueprint, families of blueprints and relationships between blueprint layers. As used herein, the term "blueprint" refers to a detailed plan or program of action serving as a model or providing guidance. The term "architecture" describes a manner in which components of a computer or computer system are organized and integrated.

Figure 1:
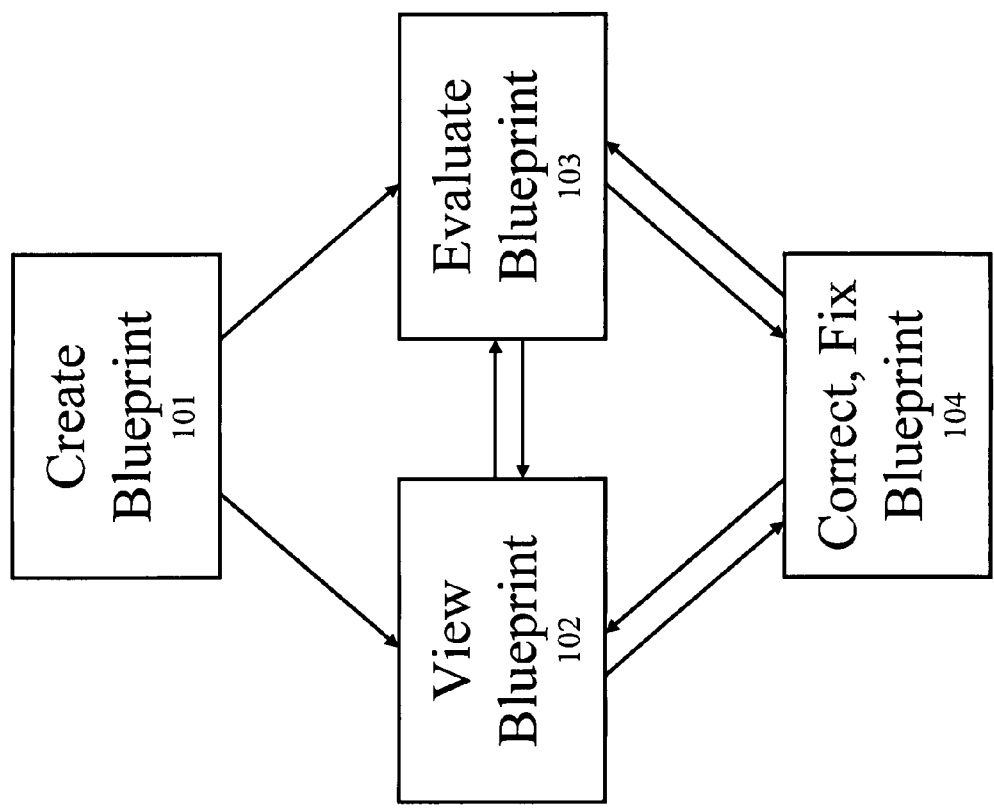
FIG. 1 is a flow chart showing the key steps of the invention.

FIG. 1 is a flow chart showing the key steps of the present invention, which are: step 101, create a blueprint; step 102, view the blueprint; step 103, evaluate the blueprint against a set of metrics and criteria; and, step 104, if necessary, correct the blueprint and repeat the view step 102 or evaluation step 103 until the blueprint is satisfactory. This process is repeated for each layer of blueprints, i.e., Business Blueprints, Solution Blueprints, and Deployment Blueprints. A blueprint can be viewed, evaluated or corrected at any time and in any order after it is created.

In general, each blueprint comprises a set of components and dependencies between components, wherein the definition of components varies depending on the type of blueprint. The Business Blueprint Release defines the vision for the functionality and structure (or topology) for a blueprint for a targeted release date. For a Business Blueprint (or specifically the created Business Blueprint Release), a business blueprint component is defined as a collection of functions, data, and events pertaining to a particular project along with those scenarios that can be executed using functions within the Business Blueprint Release component (s). Dependencies between components result from input/output dependencies (data and event exchange) between functions assigned to the components. For example, the output of Function 1 of Component A is the input to Function 2 of Component B.

For a Solution Blueprint, a solution blueprint component is defined as one or more solutions capable of satisfying the functions, scenarios, data, and events specified in the components of the Business Blueprint Release. The dependencies between the solutions result from the input/output dependencies between the functions satisfied by the solutions. There are instances, however, where one solution or a set of solutions cannot satisfy all of the requirements of a Business Blueprint Release; therefore, multiple Solution Blueprints with different solution combinations may be created, evaluated, and compared to select a "best fit."

For a Deployment Blueprint, a deployment blueprint component is defined as a platform on which one or more solutions specified in a Solution Blueprint is to be deployed. A Deployment Blueprint should have a specific deployment milestone associated with it. The Deployment Blueprint's milestone date marks (1) when respective deployment blueprint components (e.g. platforms) will be available at the deployment site and (2) when requirements associated with the Deployment Blueprint must be satisfied at the deployment site. Dependencies, if any, between the platforms result from the input/output dependencies between the functions provided by the solutions being hosted by the platforms. Dependencies may also arise due to infrastructure requirements between the platforms. For example, Platform A may require connectivity to Platform B.

Figure 2:
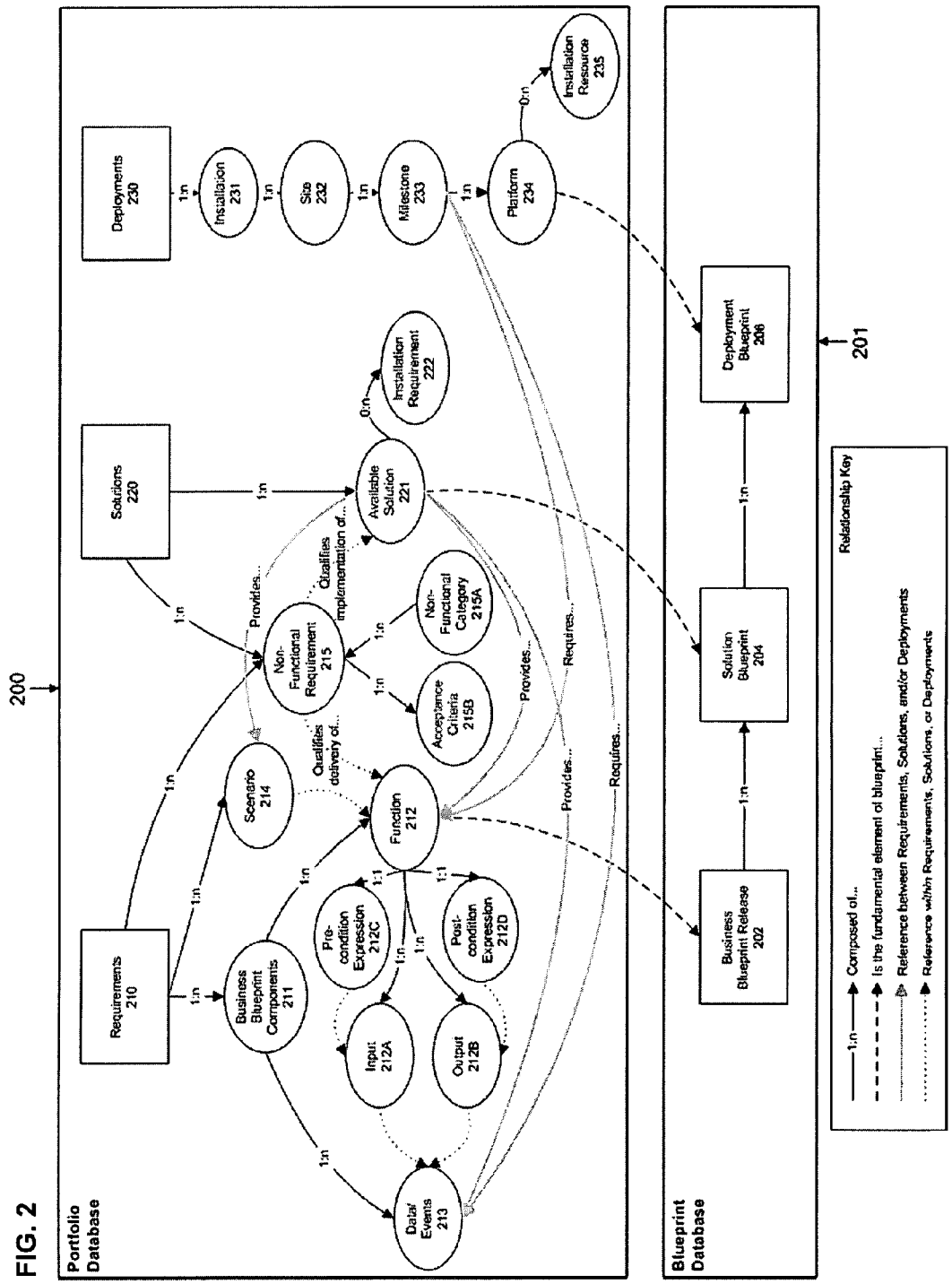
FIG. 2 is a block diagram showing the various data types used in the present invention.

FIG. 2 is an entity relationship diagram of the different data types and structures in the present invention. There are two databases shown. First, a Portfolio Database 200 containing data related to Requirements 210, Solutions 220, and Deployments 230. Second, a Blueprint Database 201 having Business Blueprints 202, Solution Blueprints 204, and Deployment Blueprints 206. A Business Blueprint Release 202 is comprised of business blueprint components 211 which are comprised of functions 212, and data and events 213. Each function 212 has input 212A and output 212B associated with it, along with a pre-condition expression 212C describing when the function will start executing and a post-condition expression 212D describing the conditions when the function will stop executing. A business blueprint component 211 can have one or more functions 212 and data and events 213 assigned to it. A Business Blueprint Release 202 also has scenarios 214 associated with it. A scenario 214 is a sequence of functions 212 occurring over a defined time interval.

In general, Requirements 210 are modeled using business blueprint components 211 and scenarios 214. A business blueprint component 211 has one or more functions 212 assigned to it. A function 212 performs a specific task. A function 212 may require an input 212A when activated and may produce an output 212B during execution or when it is done. Typically, an output for one function may be an input for a subsequent function. An input or output can be a piece of data, an event, or a report. In addition, a function 212 may also have a pre-condition expression 212C that activates the function, and a post-condition expression 212D to activate another function. A series of functions that operate in a sequence or over a period of time are grouped into scenarios 214 (also referred to as operating scenario and scenario thread). Multiple functions 212 and data and events 213 that have some commonality may be grouped into a business blueprint component 211. A Business Blueprint Release may be created by selecting one or more functions, scenarios, and/or business blueprint components targeted for deployment at a specified milestone (i.e. Release date).

Requirements may also include non-functional requirements 215, which may (1) qualify operations—qualifications on some or all of the business blueprint components, functions, scenarios, data, events, and reports described in the Business Blueprint Release, or (2) qualify implementation—qualifications on solutions and deployment environments. Examples of non-functional requirements include non-functional categories 215A such as reusability or maintainability, performance expectations for a given scenario thread, or the expected look-and-feel for a user interface implementing a given business function. The "scope" of a non-functional requirement can be at any level such as an individual function or scenario, a business component, or the system as a whole. The delivery of a non-functional requirement 215 is verified by designated acceptance criteria 215B. Non-functional requirements are particularly important to communicate expected qualities and constraints and thereby evaluate Blueprints (or parts of the Blueprints within the defined "non-functional scope") to determine if those expectations can be met.

As shown in FIG. 2, each Solution Blueprint 204 has one or more available solutions 221. Solutions in the present invention are also modeled using units of functions 212. Each available solution 221 is mapped to one or more scenarios 214, functions 212, and data and events 213 that are supported by the solution. Solutions may comprise software programs, wherein each solution may have a set of installation requirements 222 related to the software, such as a minimum amount of memory, a particular operating system and/or commercial off the shelf software, and a type of connectivity.

As shown in FIG. 2, a Deployment Blueprint 206 has one or more platforms 234. A deployment platform typically equates to a machine such as a computer where a solution 221 is deployed. Platforms 234 usually have installation resources 235 such as an amount of memory, the inclusion of a particular operating system, commercial off the shelf software, and/or type of connectivity. Multiple platforms may be grouped under a single deployment milestone 233, which relates to sites 232 and installations 231. Each deployment milestone 233 has a set of requirements, which can be defined in terms of scenarios, functions 212, and/or data and events 213.

Create Blueprints

Figure 3:
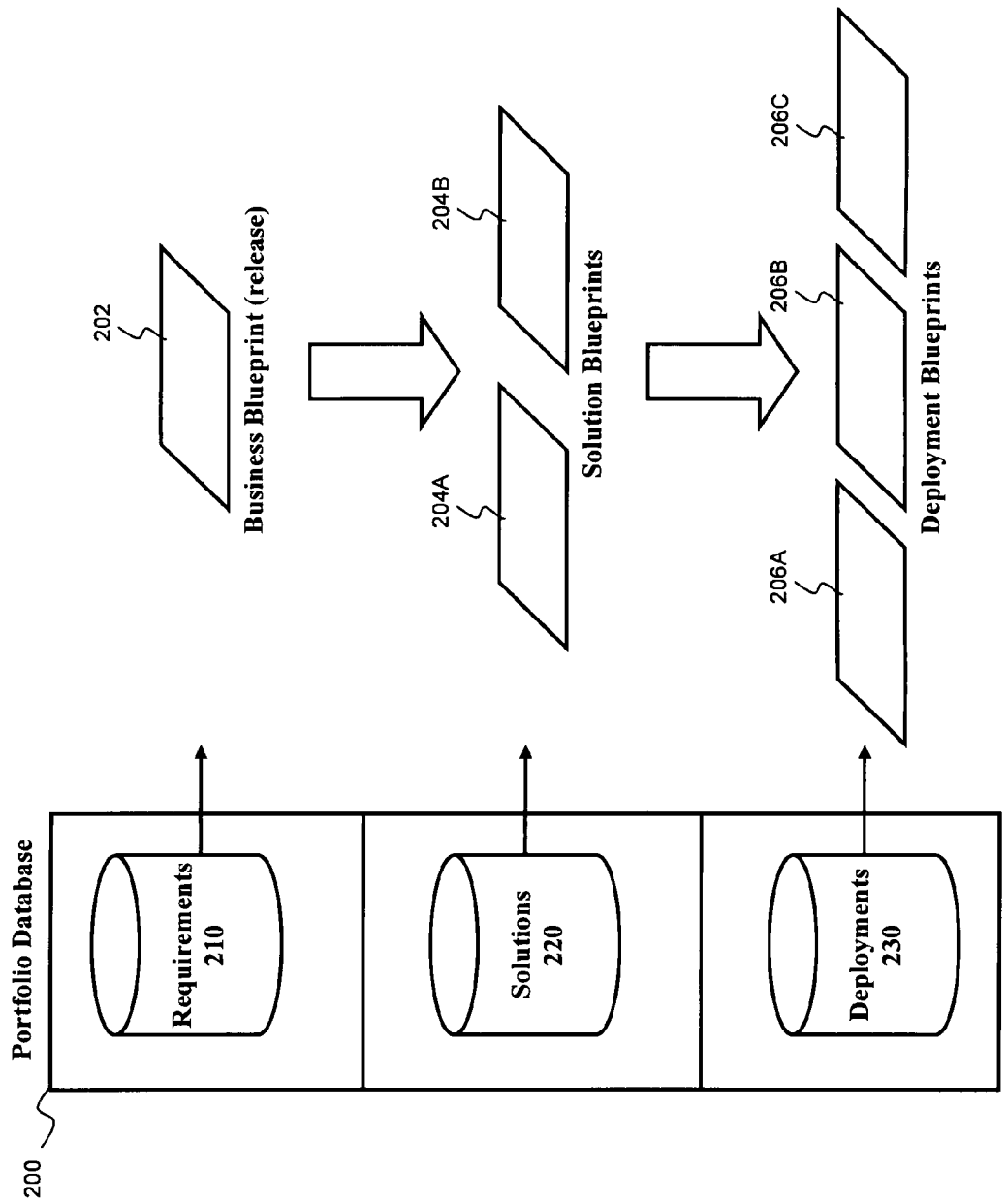
FIG. 3 is a block diagram showing the three layers of blueprints used in the present invention.

FIG. 3 shows three layers of blueprints that can be created from the Portfolio Database 200. At the first blueprint layer, a Business Blueprint Release 202 is created by selecting the desired Requirements 210 from Portfolio Database 200 containing requirements for a particular project. At the second blueprint layer, one or more Solution Blueprints 204A-B can be created based on the Business Blueprint Release 202. Solution Blueprints 204A-B are created by selecting Solutions 220 from the Portfolio Database that satisfy the requirements of the Business Blueprint Release 202. Since multiple solutions may fit the requirements of the Business Blueprint Release 202, multiple Solutions Blueprints 204A-B can be created in order to compare and contrast the different solutions. Moreover, there are instances when no one solution can fit the requirements of the Business Blueprint Release 202, thus there is a need to create multiple "best fit" Solutions Blueprints 204A-B in order to evaluate the benefits and shortcomings of each Solution Blueprint.

Referring to FIG. 3, at the third blueprint layer, one or more Deployment Blueprints 206A-C can be created based on each of the Solutions Blueprints 204A-B. Deployment Blueprints 206A-C are created by selecting a deployment site from Deployments 230 in the Portfolio Database for which a user wishes to deliver and install the solutions in the Solution Blueprints 204A-B or in the alternative, the deployment can be selected, manually or automatically, based on compatibility with the solutions in the Solution Blueprints. One Solution Blueprint 204 may be deployed on multiple sites, therefore, multiple Deployment Blueprints 204A-B may be created for each Solution Blueprint 204.

Create Blueprints Using Blueprint Analyzer

In accordance with one embodiment of the present invention, a software tool called Blueprint Analyzer 3D from AWARE Software, Inc. ("Blueprint Analyzer") provides a user with the capability of creating different types of blueprints and "families of blueprints" for creating, comparing, evaluating, and contrasting different blueprints.

Blueprint Analyzer creates blueprints using data provided by or obtained from an existing database containing requirements, solutions, and deployments pertaining to a project to be analyzed using the Blueprint Analyzer. In the preferred embodiment, the existing database is the Portfolio Database 200 created using a product called Portfolio Manager 3D from AWARE Software, Inc. ("Portfolio Manager").

Figure 4A:
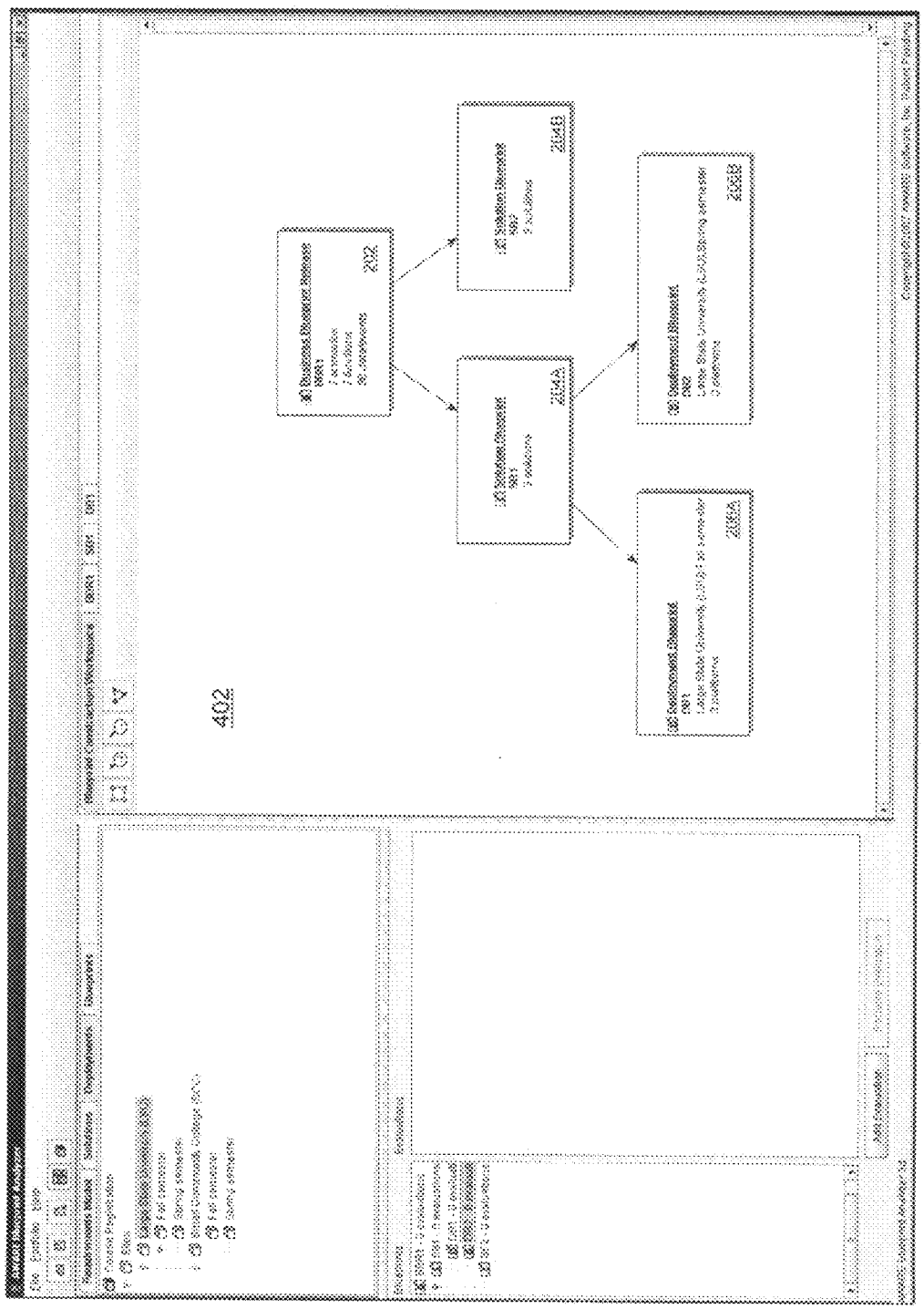
FIG. 4A is a screenshot showing a workspace for creating blueprints.

First, to create a Business Blueprint Release, the Blueprint Analyzer using a graphical user interface (GUI), provides a graphical workspace 402 (called a "sandbox") to create Business Blueprints as shown in FIG. 4A. Via the GUI, a user can select any requirements from the Portfolio Database and place the selected requirements in the workspace 402. In particular, the user can select scenarios, functions, or business blueprint components to define the desired functionality for the particular Business Blueprint 202, also referred to as a Business Blueprint Release. The Business Blueprint Release defines the vision for the functionality and structure (or topology) for a blueprint for a targeted release date.

Figure 4B:
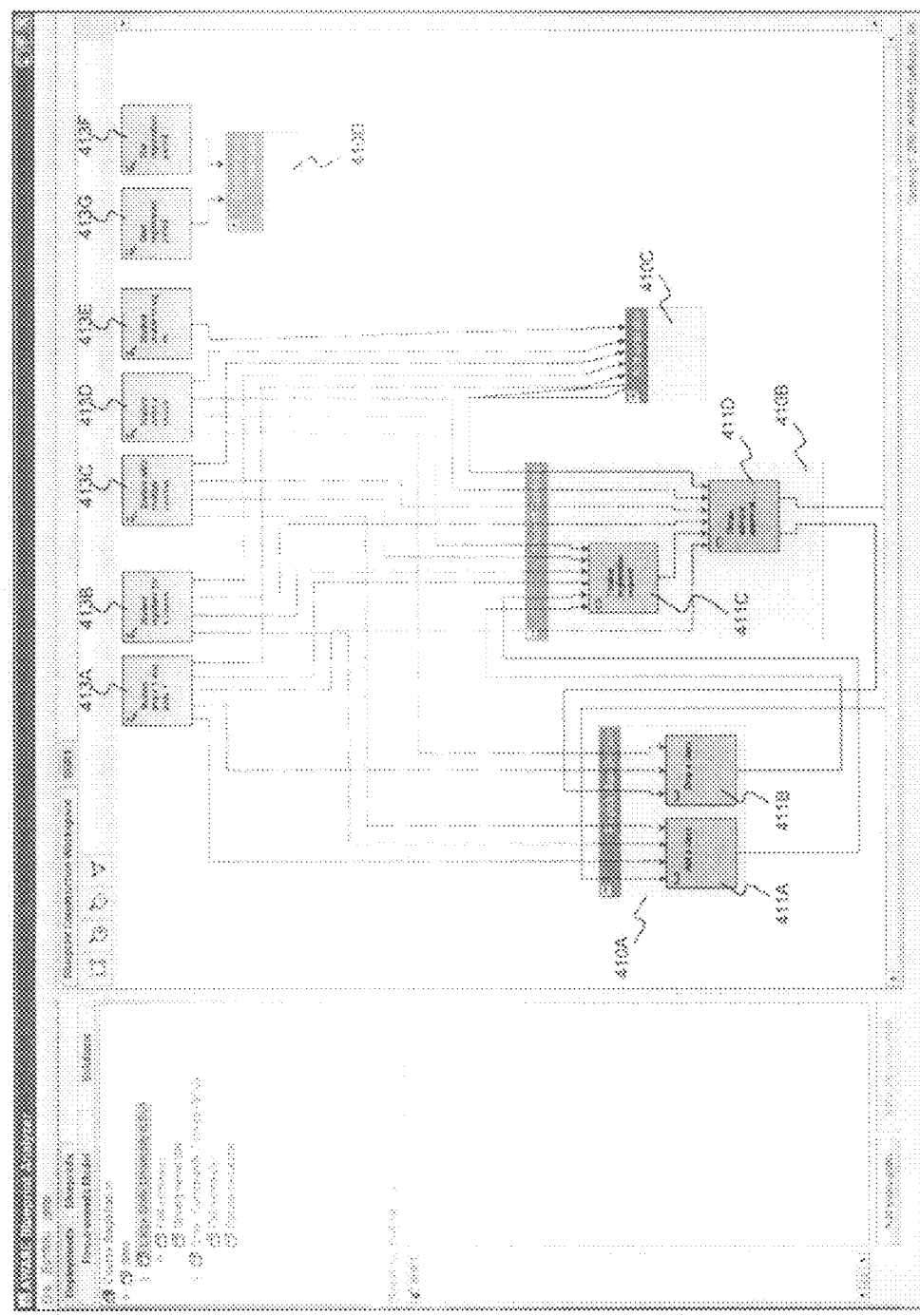
FIG. 4B is a screenshot of an exemplar Business Blueprint Release.

FIG. 4B is a screen capture (commonly referred to as a screenshot) of an exemplar Business Blueprint Release 202 created using the Blueprint Analyzer. The screenshot shows the topology of the various elements arranged on different levels. The bottom level elements represent the selected business components 410A-D, each business component 410A-D having certain functions 411A-D associated with it. Some components 410A-B are further expanded showing associated functions 411A-D inside. If the components 410A-D are connected to each other (e.g., exchanging input or output), then a solid line is drawn connecting the components 410A-D. On the top levels are the selected scenarios 413. If there is a known relationship between a scenario 413A-G and function 411A-D (i.e. the function is one of the sequence of functions in the scenario), a dotted line is drawn connecting the two elements. If one function 411A-D sends or receives data or events from another function 411A-D, a solid line is used to connect the two functions 411A-D. The absence of lines may indicate the absence of dependences or the absences of information.

Second, referring to FIG. 4A, using the GUI of the Blueprint Analyzer, a user creates a Solution Blueprint 204A or 204B by selecting the desired solutions from the Portfolio Database and placing the selected solutions in the "workspace" 402 associated with the Business Blueprint Release 202. In the alternative, Blueprint Analyzer can create a "best fit" Solution Blueprint for a particular Business Blueprint Release. Best fit means: (1) the ability of a solution to satisfy the requirements (i.e., functions, data, events, scenarios) of the associated Business Blueprint Release, and (2) the ability of a solution to comply with the structure of the associated Business Blueprint Release, e.g., matching the functions in business blueprint components with the functions in solutions components and matching the inputs/outputs between business blueprint components and the inputs/outputs between the solutions components. An "exact match" of solution component to business blueprint component occurs when a solution can implement all of the functions in the associated business blueprint component and the input and output (I/O) of the solution component match the I/O of the business blueprint component. An exact match of a Solution Blueprint to the Business Blueprint Release means that all the solutions components (functions and I/O) in the Solution Blueprint match all the business blueprint components in the Business Blueprint Release.

Figure 4C:
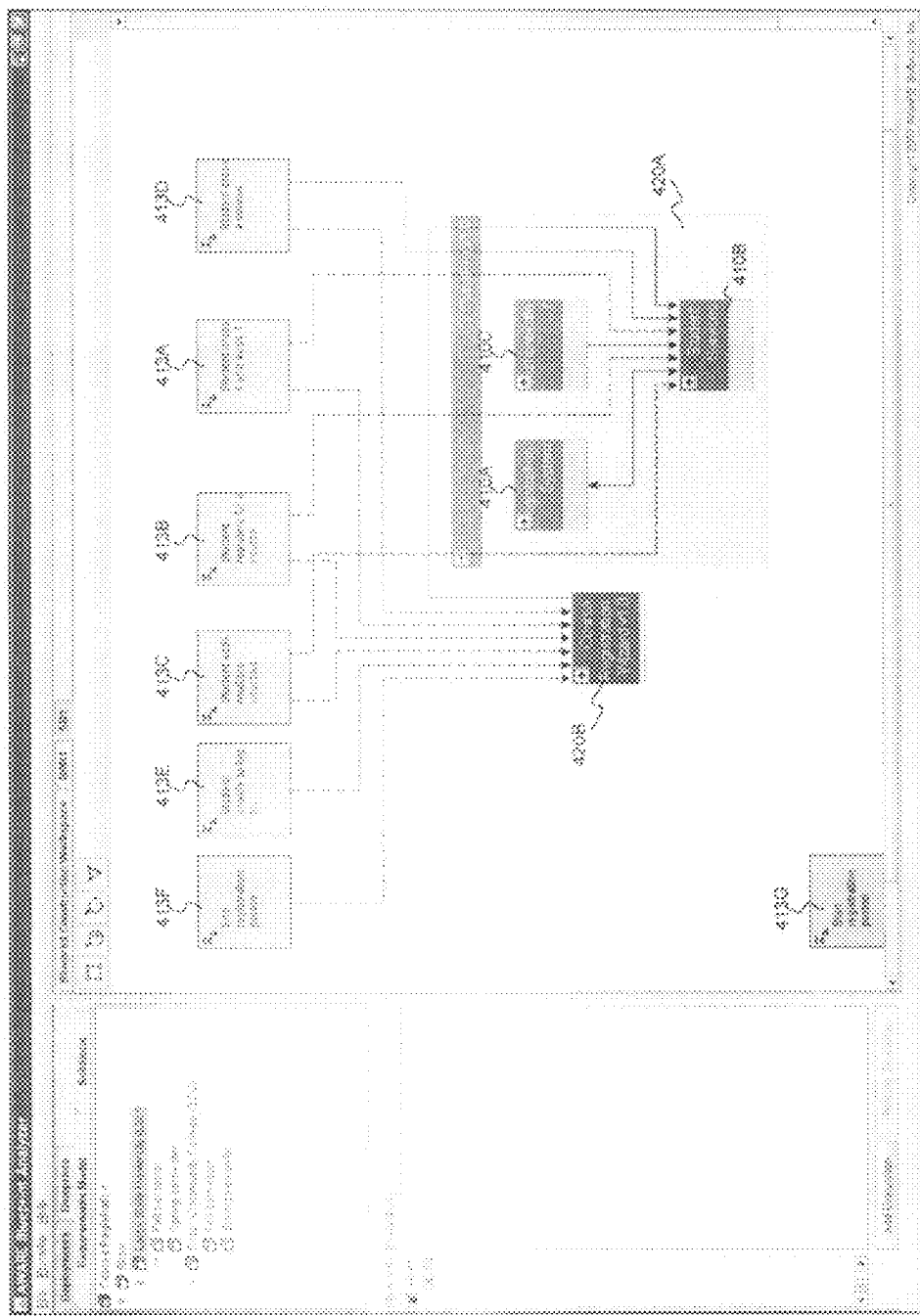
FIG. 4C is a screenshot of an exemplar Solution Blueprint.

FIG. 4C is a screenshot of an exemplar Solution Blueprint. The business components 410A-C are enclosed by the selected solutions 420A-B signifying that the selected solution 420A supports the desired business components 410A-C. If there are business blueprint components 410A-D in the Business Blueprint Release that are not covered by the selected Solutions 420A-B in the Solution Blueprint, those business components 410A-C will remain outside the Solution components boxes. If any of the functions within the business blueprint components 410A-C sends or receives data or events to or from another function, a solid line is shown connecting the business blueprint components 410A-C. If a function between respective solutions sends or receives data or events to or from another function, a solid line is shown connecting the business components 410A-C to which the functions belong. If there is a known relationship between a scenario 413A-F and a business component 410A-C (i.e. the scenario and the business component share a function), a dotted line is drawn connecting the two elements. Similarly, if a solution 420B supports a scenario 413A-F, a dotted line is drawn connecting the two elements. In this example, the "Start registration period" scenario 413G is not related to any of the business components 410A-C shown nor is it supported by the solutions 420A-B shown. The absence of lines may indicate the absence of dependences or the absences of information.

Blueprint Analyzer can create one or more (i.e., a family of) Solution Blueprints based on one Business Blueprint Release, because multiple Solution Blueprints can be created based on the selection of different configurations of solutions.

Third, referring to FIG. 4A, using the GUI of the Blueprint Analyzer, Deployment Blueprints 206A-B can be created to show how the solutions in the Solution Blueprints 204A-B will be installed, for example, which physical locations, platforms or computers on which the solutions will reside. From one Solution Blueprint, a family of Deployment Blueprint can be created, i.e., multiple Deployment Blueprints created based on different installations of the configuration of solutions found in the parent Solution Blueprint.

In FIG. 4A, Deployment Blueprints 206 A-B are created using the deployment data in the Portfolio Database, which has information pertaining to installation (i.e., infrastructure) resources available for deployments at particular deployment sites and milestone dates. From the parent Solution Blueprint, the installation requirements for each solution comprising the parent Solution Blueprint should be specified (in the Portfolio Database). For example, if a solution is computer-related, the solution specification would have such information as operating system, databases, libraries, attached networks, and devices relevant to the installation of each respective solution.

Figure 4D:
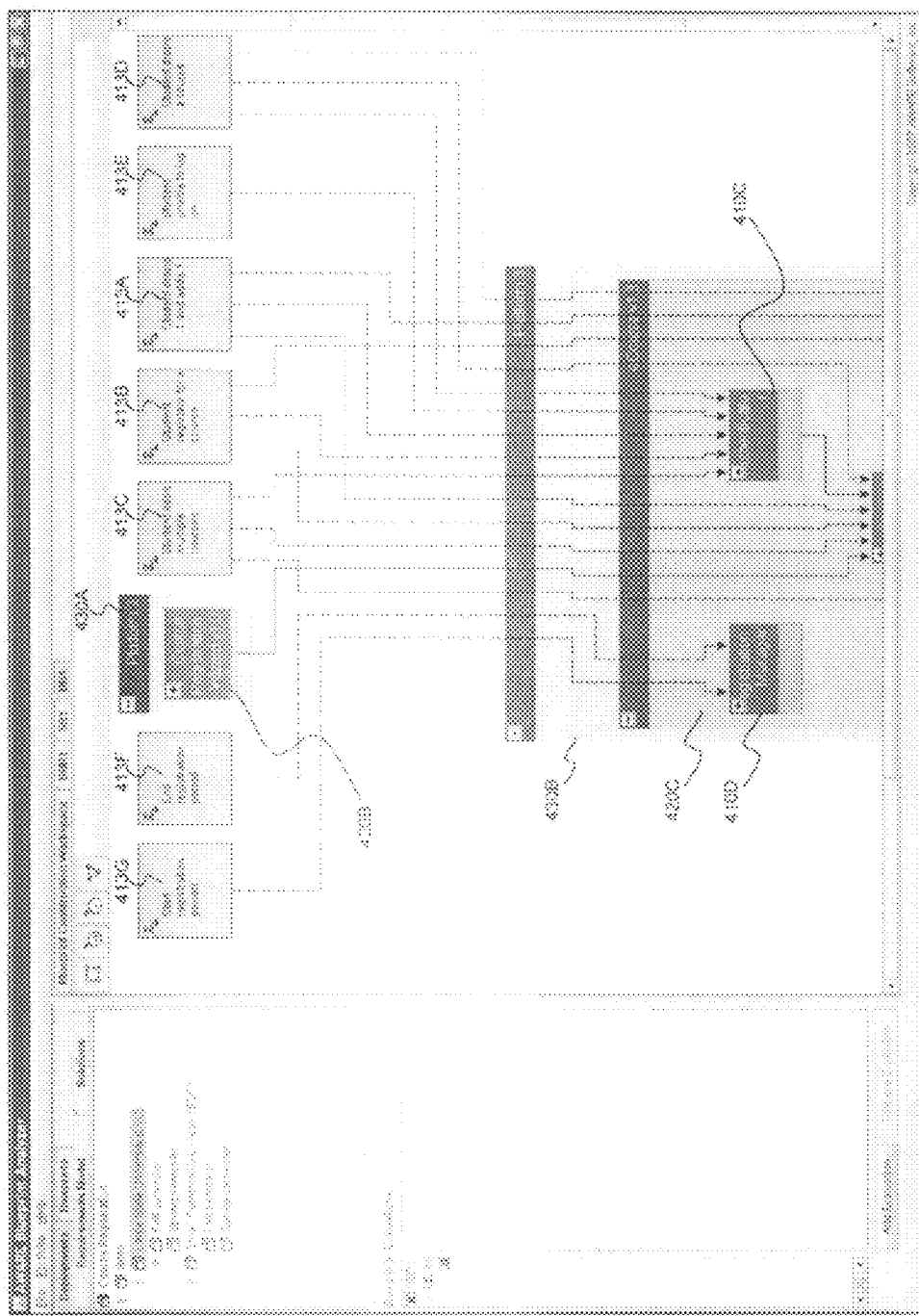
FIG. 4D is a screenshot of an exemplar Deployment Blueprint.

FIG. 4D is a screenshot of an exemplar Deployment Blueprint. Deployment Blueprint is created by selecting and placing the desired deployment sites and milestones in the workspace of the Solution Blueprint. In the example shown in FIG. 4D deployment platform 3 430B is expanded to show that "eCourse v1.3" solution 420C installed on the platform. Business components 410CD supported by the "eCourse v1.3" solution 420C are shown inside the solution. Platform 2 430A is partially expanded to show the "Course Registration Wizard v1.0" solution 420B installed on the platform. Dotted lines drawn between a scenario 413A-G and a business component 410CD show that the two elements share a function. Solid lines between two elements denote shared dependencies (i.e. input/output passed between elements).

View Blueprints.

Blueprint Analyzer allows users to view the blueprints in a graphical format. See for example FIGS. 4A-C. Visual review of the blueprints can confirm not only the desired design, but also detect problems or deficiency with the design. Problems that may be detected visually include scenarios in the Business Blueprint Release that do not reference any functions (see, for example, FIG. 4A) and multiple solutions in the Solution Blueprint that provide overlapping functionality.

Evaluate Blueprints.

In addition to visual inspection, the blueprints can be evaluated using metric-based quality analyzers. Comparing multiple blueprints facilitates early identification of problems. Because early problems are far less expense to fix (e.g. problems found in code are 100 times more expensive to fix than problems found in requirements), the ability to identify early problems can translate to lower cost in development and deployment.

The Blueprint Analyzer provides a wide range of "quality analyzer" plug-ins or modules to evaluate each of the three different types (layers) of blueprints against a wide range of metrics to identify problems and make informative tradeoff decisions: functional integration, solution integration, reusability, maintainability, flexibility, safety, liveness, reliability, performance, compatibility with legacy solutions, comprehensibility, return on investment ("ROI") on solution choices, ability to install solutions on respective computers and networks, etc.

Blueprint Analyzer brings together a suite of metrics and enables metric-based evaluations across three different layers—Business Blueprint, Solutions Blueprint, and Deployment Blueprint, enabling decision makers to "separate the concerns" along three primary dimensions (Requirements, Solutions, and Deployments). Decision-makers can separate but relate each decision and get a "reading" about the impact of that decision. In addition, these metrics can be applied to a respective blueprint or across families of blueprints. Furthermore, the metrics to be evaluated can be selectively packaged or collected to provide an over-arching, holistic evaluation of a blueprint quality.

Blueprint Analyzer provides for quantitative and tractable decisions based on computational representation and algorithms. Additionally, Blueprint Analyzer provides the right level of information and answers/evaluations allowing the system blueprints to be available to a wide range of stakeholders and experts. Blueprint Analyzer distills factors, concerns, configurations, and requirements, etc. relevant to the development, management, and deployment of a system (e.g., a software system, application, hardware system, or resource) into the aforementioned three layers and their respective analyses, giving the stakeholders the right information at the right level of detail for their decisions, facilitating strategic decision-making.

Blueprint Evaluation GUI

Figure 5:
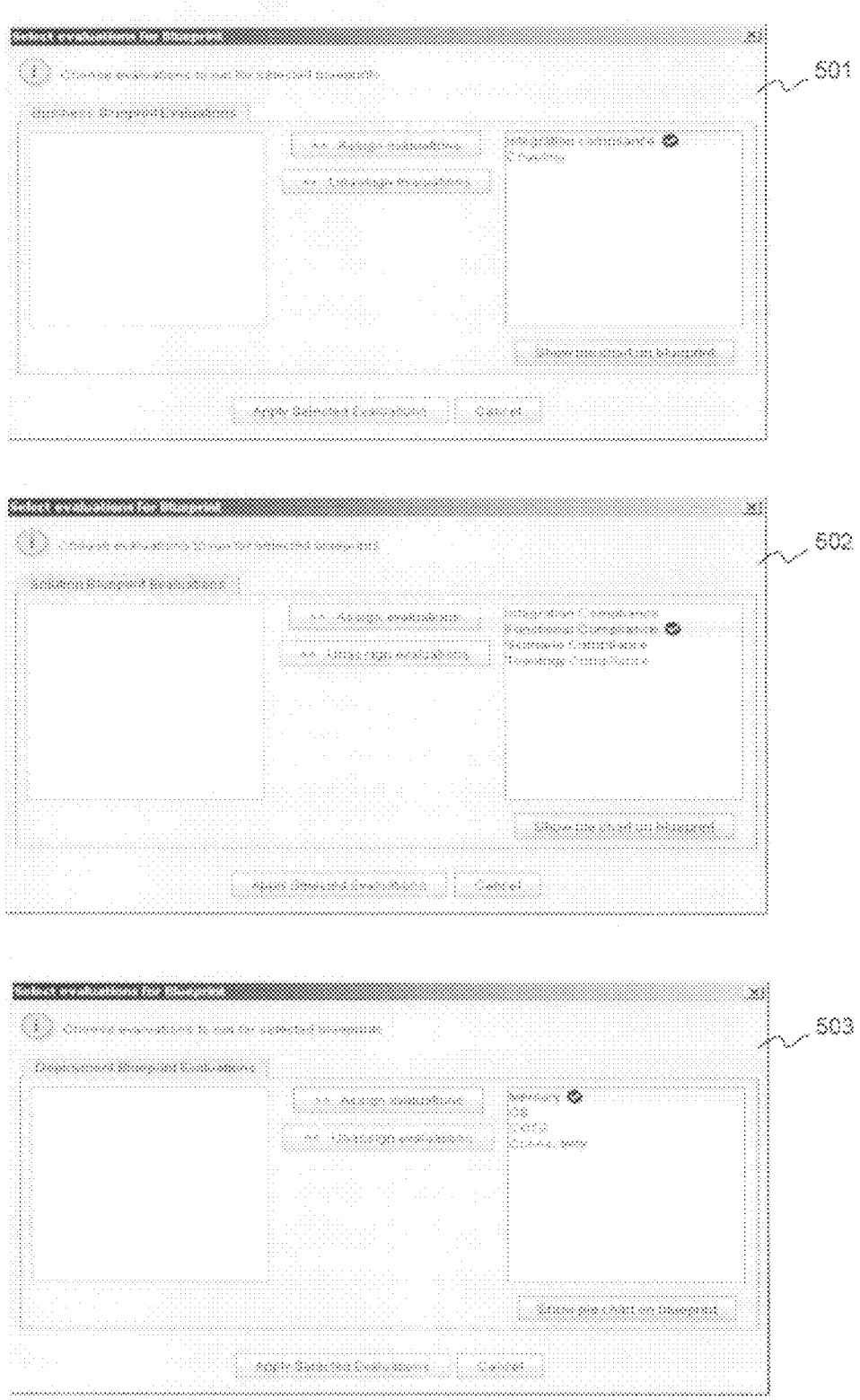
FIG. 5 is a screenshot showing the available evaluation modules for the various blueprints.

Different evaluation modules can be selected at each level using the graphical user interface (GUI) of the Blueprint Analyzer. Referring to FIG. 5, evaluations options are displayed by right-clicking on a particular Business Blueprint, Solution Blueprint, or Deployment Blueprint to open up an evaluation window (501-503, respectively). Once the user selects the desired evaluation modules, the user can select the location of the results on the GUI. Evaluations can be run on-demand or continuously as blueprints are being constructed or revised. Certain evaluation modules are run by the client computer ("client-side") to provide for "real-time" evaluations. Other evaluation modules are run by the server ("server-side") in the background. Results for these evaluation modules must be refreshed by the user, so that the server uses the most recent data. Evaluations may also be categorized as "static" or "dynamic." Static evaluations assess the structure of the blueprint and the prescribed system, such as component size or coupling, while dynamic evaluations predict execution properties of the prescribed system and are performed through simulation or traversing an execution model. Users may also choose to compare the evaluation of multiple blueprints at once.

Business Blueprint Evaluations

Business Blueprints can be evaluated using a wide range of modules. Examples include integration, performance, reliability, completeness, reusability, and flexibility. The integration module evaluates the extent inputs and outputs are satisfied for those functions within the defined Business Blueprint Release. For full integration, each input should have a source function and each output should have a destination function. For example, if a first function relies on an input from a second function, the integration module evaluates whether the second function is included in the blueprint.

The performance module measures the speed and efficiency of execution such as throughput, latency, and time to completion. For example, a performance evaluation may run simulations according to run-time scenario specifications to record latency and utilization statistics while varying scenario invocation frequency, function execution characteristics such as mutual exclusion and resource requirements, and available component execution resources. The user sets the threshold for acceptable utilization and latency. For each scenario, scenario specifications include information such as relative frequency of execution in the project under consideration. Additional function and component execution attributes, such as whether a component can only execute one function at a time, is also required.

The reliability module measures the degree to which a Business Blueprint Release is resilient to faults. Given the dependencies between functions, components, and scenarios, the reliability of each affects the other and therefore, the reliability of the overall system. Holding all parameters constant, this module measures the impact on the overall system, business blueprint components or scenarios as a result from changing the reliability of a scenario, function, or business blueprint component respectively. For example, if the reliability of a function is varied from 100% to 0%, what is the impact on the reliability of the system, respective business blueprint components, and respective scenario operations. In essence, the reliability evaluation is a sensitivity analysis.

The completeness module determines whether the Business Blueprint Release reflects the features required by the stakeholders. This module performs a "model checking" algorithm to determine if all defined scenarios can be satisfied and whether constituent functions can be executed in the order indicated based on specified pre-/post-conditions. The completeness module determines if all scenarios can be executed and all inputs, outputs, pre- and post-conditions of all functions can be satisfied.

The correctness module is captured in two metrics: safety and liveness. Safety determines whether the system defined in the Business Blueprint Release can safely attain a valid end state. The safety algorithm checks to insure the post-condition of the function is satisfied and there are no outputs to the function that are "unused" by other functions in the system. Liveness determines whether any unreachable state exist in the system. This module performs a "model checking" algorithm to determine if precondition expression disjunctive clauses for all functions will evaluate to true under some condition. The liveness algorithm seeks to find parts of the system that will never execute given the specification provided.

The reusability module measures the degree of coupling (input/output exchange) between components within a Business Blueprint Release, (input/output exchange) between solutions within a Solution Blueprint, and (input/output exchange) between platforms within a Deployment Blueprint. The number of input/output connections between units (components, solutions or platforms) is counted, and the results are presented in real-time. The user sets the threshold parameter on what is an acceptable coupling value.

Flexibility measures the ability to reconfigure components into super components without modification to the components definition. For example, this module calculates component size and complexity metrics. Examples of component size and complexity may include the number of functions, data, or events in a component, the number of input/output dependencies between functions within a component, etc.

In addition, all visualizations of the Business Blueprint Release evaluations are provided in some form intended for a wide range of system stakeholders. Charts, color coding, tables are all selected forms of visualizing the evaluations of a complex system into salient forms allowing comprehension by stakeholders with varying degrees of expertise and knowledge of the system implementation.

Solution Blueprint Evaluations

Each Solution Blueprint defines a potential configuration of solutions to implement functionality described in the associated "parent" Business Blueprint. Therefore, evaluations for each Solution Blueprint are performed in the context of the parent Business Blueprint Release. Solution Blueprints can be evaluated according to a range of metrics including performance, reliability, and compliance. Performance of a Solution Blueprint is evaluated using scenario-driven simulations and model checking as in the Business Blueprint Release evaluations, but using additional information based on the specifications of those solutions selected as members of the Solution Blueprint to satisfy the Business Blueprint Release. Likewise, reliability evaluations of the Solution Blueprint are conducted as in the Business Blueprint Release, but using stated mean time between failures or MTBF values from solution providers.

Different modules are available to evaluate compliance, to indicate whether the selected Solution Blueprint can satisfy the parent Business Blueprint. Typically, these modules are run by the client and provide real-time results. The scenario compliance module measures the degree to which the selected Solution Blueprint satisfies the scenarios in the parent Business Blueprint Release. The scenario compliance module determines whether the solutions in the Solution Blueprint are capable of supporting the required scenarios in the Business Blueprint Release.

Similarly, the functional compliance module measures the degree to which the selected Solution Blueprint satisfies the functions in the parent Business Blueprint Release. The functional compliance determines whether the solutions in the Solution Blueprint are capable of supporting the required functions in the Business Blueprint Release.

The integration compliance module evaluates whether a first function provided by a solution in the Solution Blueprint requires an input or output from a second function, and if so whether the second function is provided by the solution. This integration compliance module determines whether the solutions in the Solution Blueprint are capable of fulfilling all the inputs and outputs of the supported functions in the Business Blueprint Release.

The topology compliance module measures to what degree the solutions in the Solution Blueprint have the same "boundaries" as the business blueprint components in the Business Blueprint Release, such that a given solution provides exactly the same functions as the business blueprint component the solution is intended to implement and accepts the same input and generates the same output as the business blueprint component it is intended to implement. In other words, the solution should have the same capabilities (functions) and the same interfaces as the business blueprint component it is intended to implement. The topology of the Business Blueprint Release is defined by the number of business blueprint components, functions, and input/output connectors to/from business blueprint components. Similarly, the topology of the Solution Blueprint is defined by the number of solutions, functions performed by the solutions, and input/output connectors to/from solutions. If a solution provides more or less functions than the respective business blueprint component it is mapped to (e.g. the solution has the functionality of two business blueprint components) or the solution has more or less inputs or outputs, the Solution Blueprint topology will differ from the Business Blueprint Release topology and consequently will deviate from the vision of the system structure (topology) established by the Business Blueprint Release.

All visualizations of the Solution Blueprint evaluations are provided in some form intended for a wide range of system stakeholders. Charts, color coding, tables are all selected forms of visualizing the evaluations of a complex system into salient forms allowing comprehension by stakeholders with varying degrees of expertise and knowledge of the system implementation.

Deployment Blueprint Evaluations

Each Deployment Blueprint defines a potential configuration of platforms on which to "house" solutions described in the associated "parent" Solution Blueprint. Therefore, evaluations for each Deployment Blueprint are performed in the context of the parent Solution Blueprint. As a result, calculations used to evaluate a Deployment Blueprint are based on the solutions' installation requirements and the platforms' installation (i.e. infrastructure) resources. Deployment Blueprints can be evaluated in terms of a wide range of resources. Examples include memory, operating system (OS), commercial off the shelf software (COTS), and connectivity. These evaluation modules are performed on the client computer and the results of which are presented in real-time. The memory evaluation module determines whether the platform has sufficient memory to support the solutions allocated to the platform. The OS evaluation module determines whether the OS on the platform is compatible with the OS requirements of the solutions allocated to the platform. The COTS evaluation module determines whether the platform has the resident COTS necessary to support the COTS requirements of the solutions— example COTS includes database or word processor software required by the solution. The connectivity evaluation module determines whether the platform has compatible and sufficient network infrastructure necessary to support the input/output requirements of the solutions. The scope of these evaluations may vary depending on how the solutions are configured on the deployment platforms. For each solution residing on a particular platform, the compatibility of the solution with the platform is evaluated. For multiple solutions residing on a particular platform, solution-to-solution compatibility is evaluated. In addition for solutions residing on multiple platforms requiring input/output communications, solution-to-solutions compatibility between different platforms is also evaluated.

All visualizations of the Deployment Blueprint evaluations are provided in some form intended for a wide range of system stakeholders. Charts, color coding, tables are all selected forms of visualizing the evaluations of a complex system into salient forms allowing comprehension by stakeholders with varying degrees of expertise and knowledge of the system implementation.

Detecting Problems

Results of blueprint creations and evaluations can be displayed graphically or printed out in report format using "box-and-line" node-edge drawings, pie charts, bar graphs, and tables. When depicting evaluation results, emphasis is placed on providing quick assessment for decision support at the architect/manager level, with results being made accessible to all skill levels and in forms highly correlated to the decisions. In general, pie charts are consistently used when the concept of a portion of the whole is being conveyed. Salient categories in data points such as good, acceptable, and unacceptable are also used. When a quick assessment is not sufficient, the user can drill down to obtain details. These details are generally offered at two levels: (i) evaluation results summarized to render the quick assessment level, and (ii) data and parameters used to run the evaluation and/or calculated during the evaluation.

Fixing Problems

Users can fix problems manually, automatically, or semi-automatically. Users can manually change the specifications to resolve problems. Users can also choose to allow Blueprint Analyzer to automatically create new specifications to resolve the problems. Alternatively, users can choose to resolve the problems semi-automatically using a Help Wizard user interface. The Help Wizard provides suggested fixes for problems.

Fixes for problems detected in a Business Blueprint Release may include reallocating functionality between Business Blueprint components, modifying function input/output specifications, and adding or deleting Business Blueprint components. Fixes for problems detected in a Solution Blueprint may include finding a better-fit solution and/or if possible, reallocating functionalities in the Business Blueprint Release to different business blueprint components. Fixes for problems detected in a Deployment Blueprint may include increasing memory on a platform and modifying database residing on the platform to match the solution installation requirements.

Implementation of Blueprint Analyzer

There are many different ways to implement the present invention on various computing platforms. The above disclosure is sufficient to enable one skilled in the art to implement the present invention on most computing platforms, such as mainframe systems, client-server systems, and personal computing systems. In the preferred embodiment, the present invention is implemented in a client-server environment as discussed below.

Figure 6:
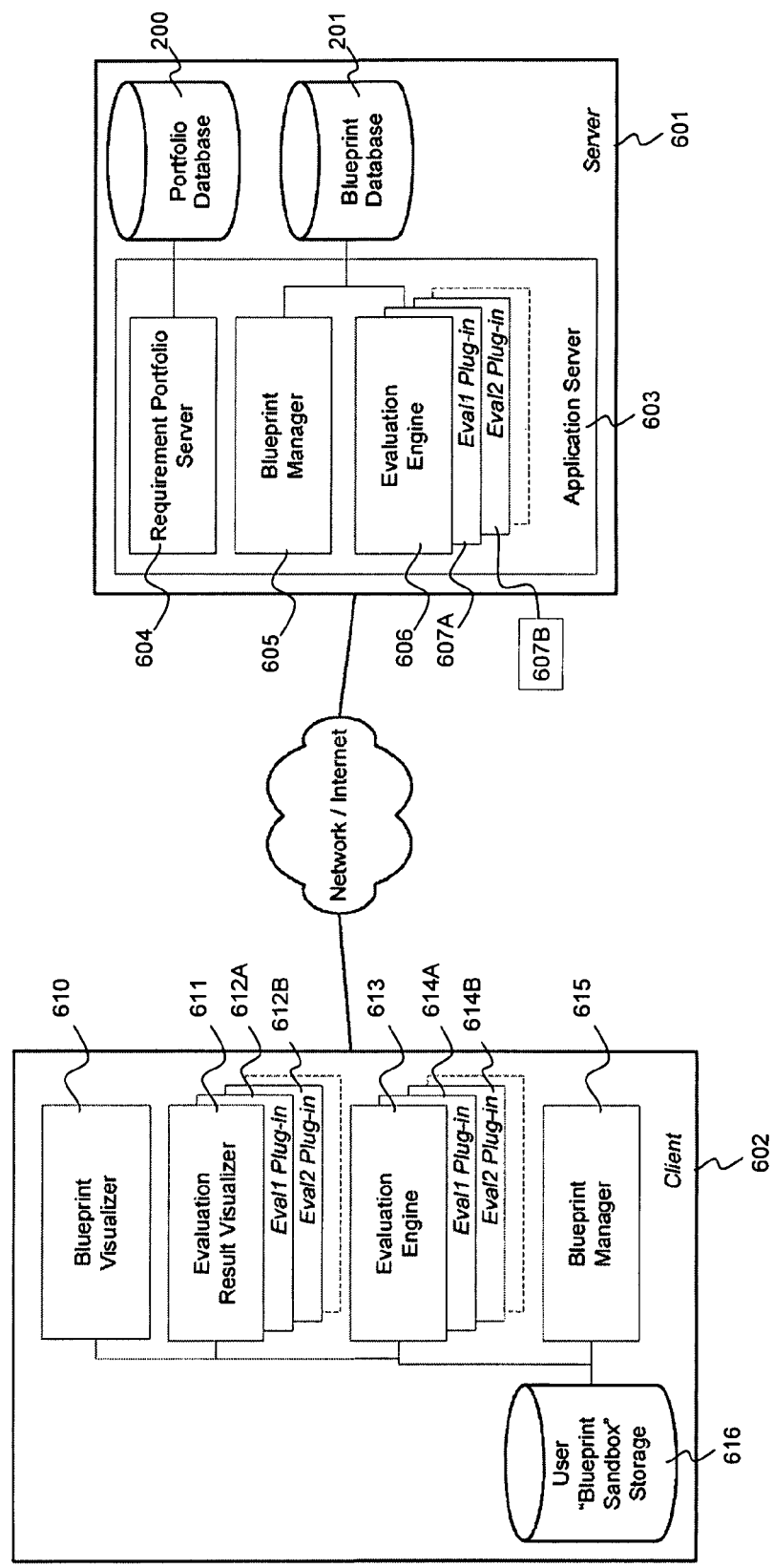
FIG. 6 is a block diagram showing the key components of Blueprint Analyzer as implemented in a client-server computing environment.

FIG. 6 is a block diagram showing the architecture and key components of Blueprint Analyzer as implemented in a client-server computing environment having a server computer 601 and at least one client computer 602. An Application Server 603 resides on the server computer 601. The Application Server 603 comprises a Requirement Portfolio Server 604, Blueprint Manager 605, and Evaluation Engine 606 with one or more plug-in modules 607A-B. There are two relational databases, Portfolio Database 200 and Blueprint Database 201, located on the server computer 601. Several components execute on the client computer 602: Blueprint Visualizer 610, Evaluation Result Visualizer 611 with one or more plug-in modules 612A-B, an Evaluation Engine 613 with one or more plug-in modules 614A-B, Blueprint Manager 615, and a User "Blueprint Sandbox" Storage database 616.

From a functional standpoint, the Requirements Server 604 retrieves requirements, solutions and deployments from the Portfolio Database 200 for use in creating blueprints. The Portfolio Database 200 is created by the Portfolio Manager software and contains requirements, solutions, and deployments for a particular project or portfolio. The Blueprint Manager 605 retrieves from and stores (commits) blueprints and blueprint evaluations on the Blueprint Database 201. Before committing blueprints and associated evaluations created by the client computer 602, the Blueprint Manager 605 compares the blueprint family stored in client computer's 602 Sandbox database 616 to blueprints in the server computer's 601 Blueprint Database 201. This is done to determine whether requirements, solutions, and/or deployments have evolved and to compare blueprint family being committed to blueprints previously committed. The Evaluation Engine 606 provides plug-ins 607A-B for various blueprint evaluations conducted primarily in the "background" computing mode due to lengthy or resource-intensive computation requirement.

On the client computer 602, the Blueprint Manager 615 retrieves requirements, solutions, and deployments data from the Portfolio Database 200 located on the server 601. When creating a Business Blueprint Release, the Blueprint Manager 615 retrieves the selected requirements along with their associated dependencies from the Portfolio Database 200. When creating a Solution Blueprint, the Blueprint Manager 615 retrieves the selected solutions and maps them to requirements in the Business Blueprint Release that can be satisfied. When creating a Deployment Blueprint 206, the Blueprint Manager 615 retrieves the selected deployment platforms. The Blueprint Manager 615 allows the users to associate the selected solutions in the Solution Blueprint with the selected platforms in the Deployment Blueprint (i.e., allowing users to choose which platform to deploy each solution).

On the client computer 602, the Blueprint Visualizer 610 graphically displays blueprints and blueprint content at various levels of detail. The Evaluation Result Visualizer 611 provides plug-ins 612A-B for each level of blueprint to display a high-level "executive" view of the evaluation results, such as pie charts, and detailed view. The Evaluation Engine 613 provides plug-ins 614A-B at each level of the blueprints with analyzers that can operate in real time as blueprints are created and modified. Typically, evaluation plug-ins 612 executed by the client computer's 602 Evaluation Engine 613 require minimal computational resources. The Blueprint Manager 615 manipulates blueprints, stores blueprints and their associated evaluations and displays requirements.

Different network interactions occur between the client 602 and the server 601 depending on the process. One example network interaction occurs at the start of a Blueprint Analyzer project when creating a new workspace. When initiating a blueprint project, the client 602 retrieves a point-in-time snapshot of Portfolio Database's 200 requirements, solutions, and deployments via the Requirement Portfolio Server 604. Since the Portfolio Database 200 evolves over time, one option is to construct blueprints from requirements, solutions, and deployments at a particular point-in-time. Therefore, blueprints and their associated evaluations represent a point-in-time snapshot of the Portfolio Database 200. A second option accommodates the evolution of Portfolio Database content by periodically comparing the requirements, solutions, and deployments used to construct blueprints with the Portfolio Database and notifying the Blueprint Analyzer user when inconsistencies are detected.

Another network interaction occurs when blueprints are being modified or evaluated. When the user runs a server-side background evaluation, where the evaluation is executed on-demand and the results are not presented in real-time, the client Evaluation Engine 613 submits a request to the server Evaluation Engine 606 to perform the evaluation as a background task and return the results when complete. As with any "foreground" evaluation performed by the client, the results are retained as part of the workspace. As the respective blueprints are changed, the results from the background evaluations may become stale and need to be recalculated; although, even stale results can be retained since they may still provide value for decision-making. This is especially true if the blueprint modifications were minor; i.e., there is not sufficient return on investment ("ROI") for recalculating. At any time, the user can request a fresh snapshot of portfolio requirements, solutions, and deployments via the Requirement Portfolio Server 604. The client 602 will display differences from the previous snapshot and how the revised portfolio data would impact the blueprints under construction and their associated evaluations.

Another network interaction occurs when blueprints are committed to the Blueprint Database 201. The Requirement Portfolio Server 604 is again consulted to retrieve the current set of requirements, solutions, and deployments. The resulting data is compared to the original portfolio snapshot and the client 602 displays the differences to the user. If a blueprint family with the same Business Blueprint Release was previously committed to the Blueprint Relational Database 201, the server Blueprint Manager 605 compares the two families and the client 602 displays the differences to the user. The server Blueprint Manager 605 stores ("checks-in" or "commits") the user's blueprint family in the Blueprint Sandbox 616 to the Blueprint Database 201.

Data for the blueprints in the Blueprint Analyzer are stored on databases at two locations: on the user's Blueprint Sandbox workspace 616 in the client computer 602 and on the Blueprint Database 201 on the server 601. The entire collection of blueprints data can persist locally on the user's client computer 602 or it can be committed to the Blueprint Database 201 on the server 601. In general, both blueprint databases, Blueprint Sandbox 616 and Blueprint Database 201, share the same data structure, but the underlying storage format may differ. For example, data may be stored under a specific database management system format, as XML files, or as binary files.

Figure 7:
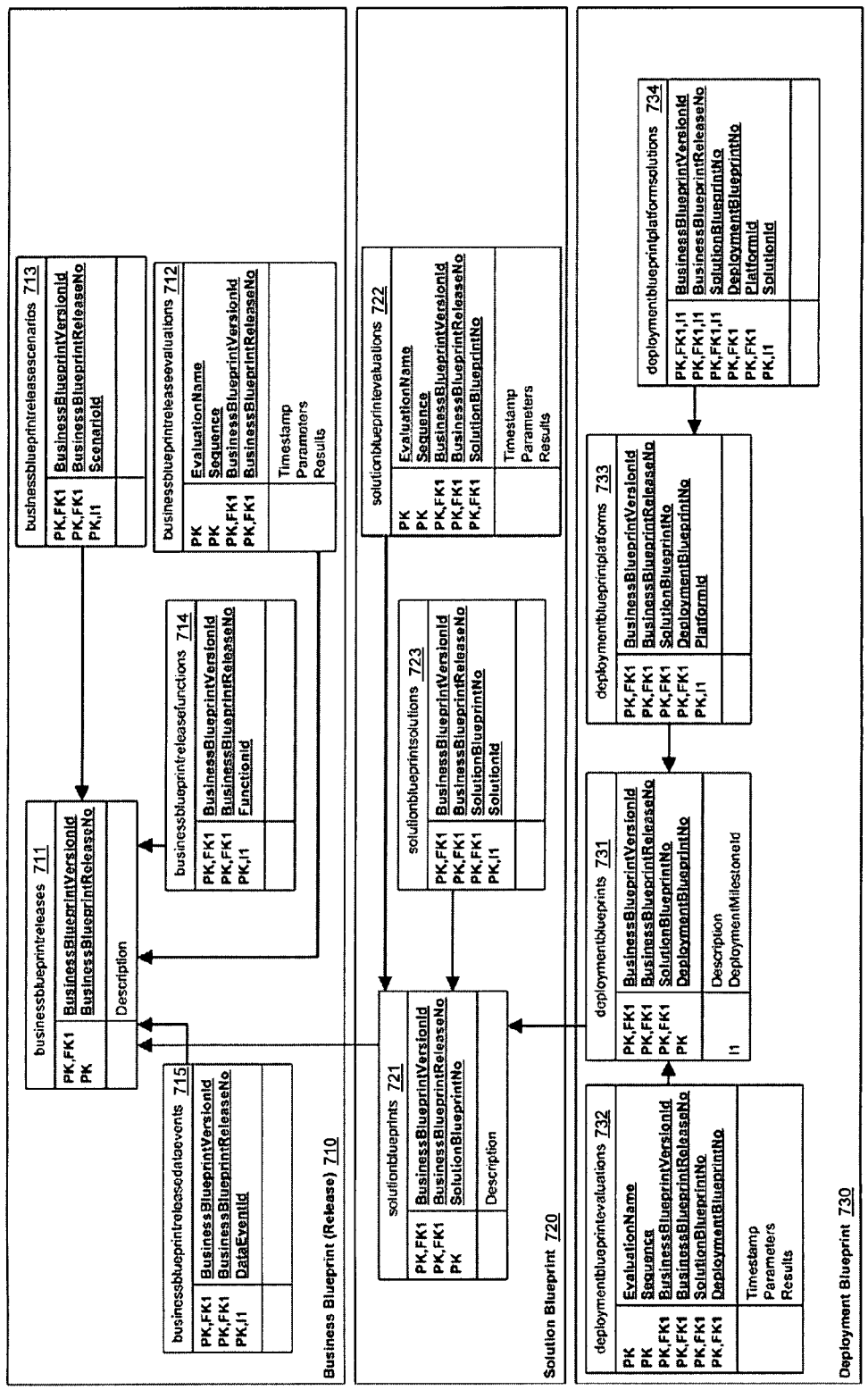
FIG. 7 is a database diagram showing the relationships between the various tables used in the Blueprint Analyzer.

FIG. 7 shows the data structure and relationships for the blueprints in the Blueprint Database 201. The tables are divided into three shaded areas relating to a particular blueprint level. At each level, there is a parent table that describes the blueprints at that level. These parent tables are named businessblueprintreleases 711, solutionblueprints 721, and deploymentblueprints 731. In addition, there is a child table at each level that records evaluation data (712, 722 and 732 respectively). Each evaluation table contains timestamp, parameters, and results data. The evaluation parameters and results fields are stored in XML structures that are unique to each evaluation type.

At the Business Blueprint level 710, there are three child tables, namely businessblueprintreleasescenarios 713, businessblueprintreleasefunctions 714, and businessblueprintreleasedataevents 715, that hold the scenarios, functions, data, and event data for each Business Blueprint Release. These fields in these tables hold keys that are associated with their respective data from the Portfolio Database. As the definitions of functions, scenarios, data, and events evolve (i.e., as new content is modeled), a new Business Blueprint Version is created. When a Business Blueprint Release is created, the release contains all or part of the Business Blueprint Version. Evaluations for Business Blueprints are recorded in the businessblueprintreleaseevaluations table 712.

At the Solution Blueprint level 720, each Solution Blueprint in the solutionblueprints parent table 721 is linked to a particular Business Blueprint Release. In addition, each Solution Blueprint contains one or more individual solutions stored in the solutionblueprintsolutions table 723.

At the Deployment Blueprint level 730, each Deployment Blueprint in the deploymentblueprints parent table 731 is linked to a particular Solution Blueprint. In addition, each Deployment Blueprint contains one or more platforms stored in the deploymentblueprintplatforms table 733. Each platform is also associated with one or more individual solutions as listed in the deploymentblueprintplatformsolutions table 734.

Example Usage Scenario

Figure 8A:
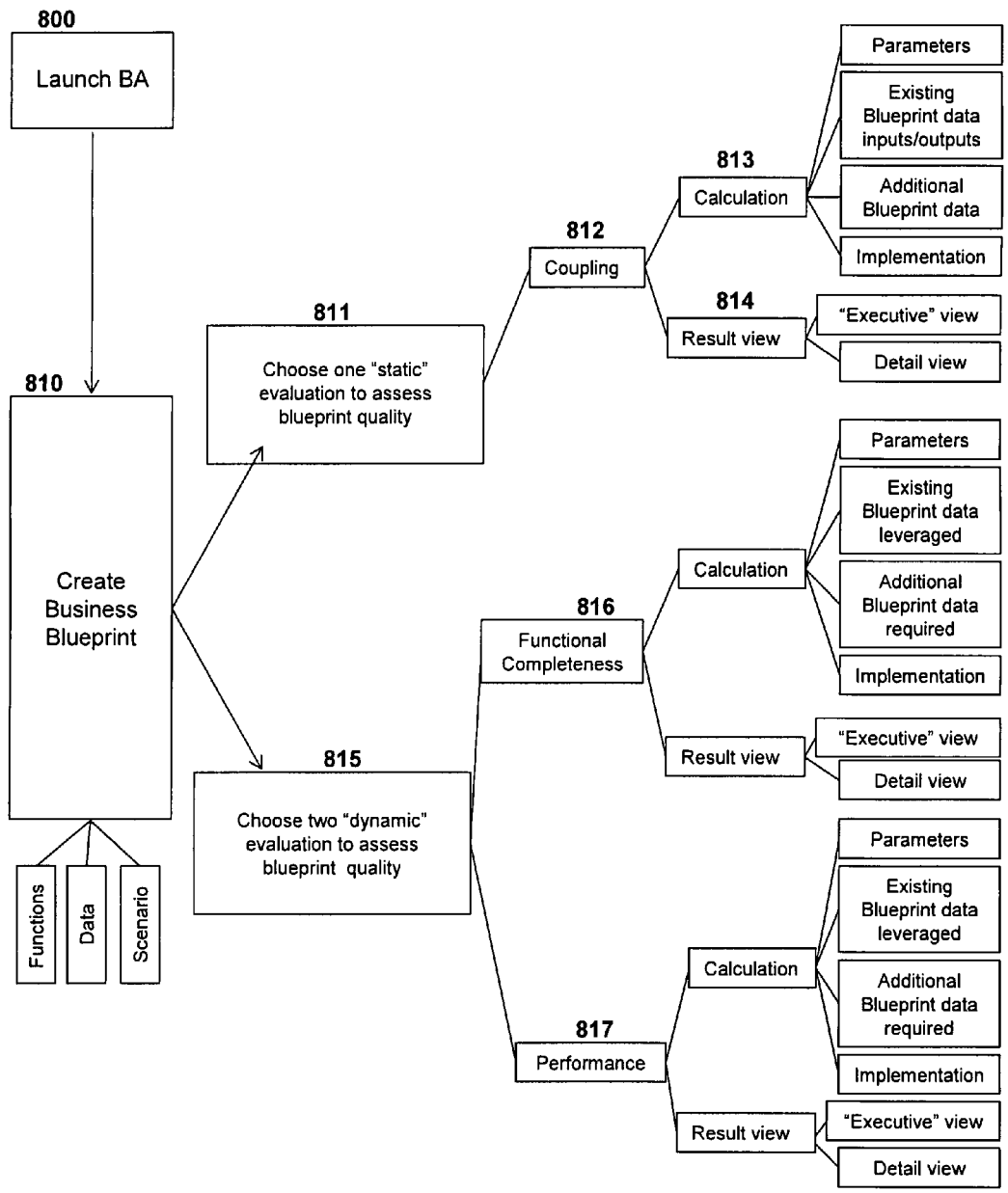
FIGS. 8A-B are flow diagrams of an example usage of the Blueprint Analyzer.
Figure 8B:
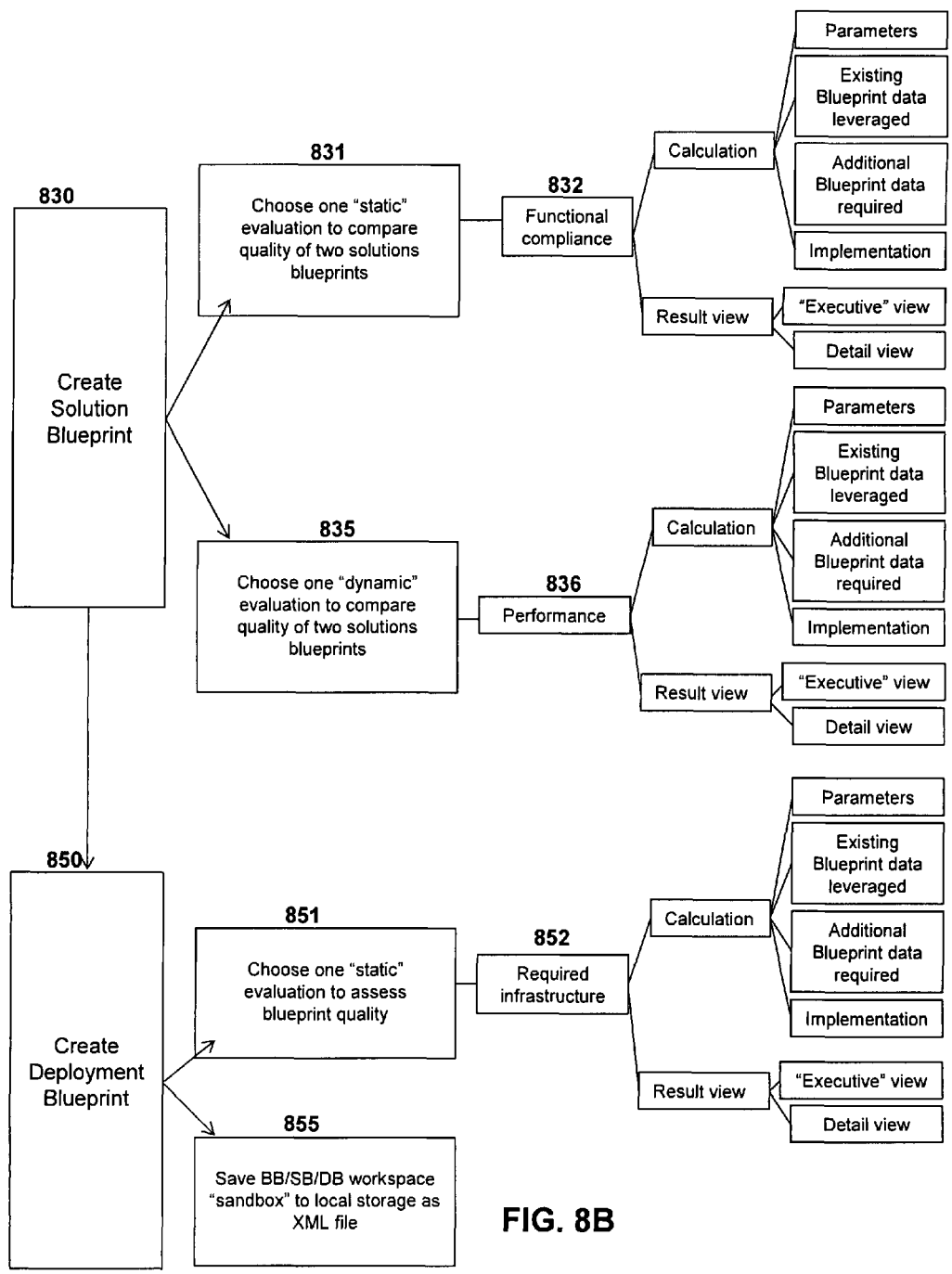

An example usage of the Blueprint Analyzer is shown in the flow diagrams of FIG. 8A-B. Referring to FIG. 8A, in step 800, launch the Blueprint Analyzer program, select a portfolio project and its associated Portfolio Database, and open a new blueprint workspace ("sandbox"). In step 810, create a Business Blueprint Release by selecting the desired functions, data and scenarios, which are associated with business components, from the Portfolio Database. In step 811, choose one "static" evaluation to assess blueprint quality, a "coupling" evaluation 812, which performs the calculation 813 of counting the number of input/output connections between components and provides a result view 814 showing both the "executive" high-level view and a detailed view.

In step 815, choose two "dynamic" evaluations to assess the quality of the Business Blueprint Release. First, perform a "functional completeness" evaluation 816 to assess pre-/post-condition expressions specified for each function to ensure that all scenarios can be executed given pre-/post-conditions. Second, execute a "performance" evaluation 817, which is a simulation whereby scenarios are "executed" at selected frequencies and average and maximum latency and utilization statistics are recorded for scenarios, functions, and components.

Referring to FIG. 8B, in step 830, create two Solution Blueprints by selecting the desired solutions from the Portfolio Database based on the Business Blueprint Release. For the first Solution Blueprint, request that Blueprint Analyzer select solutions automatically based on a heuristic that satisfies the same functions as the respective business blueprint components. Next, in step 831, execute a "static" evaluation to compare the quality of the two Solutions Blueprints. The static evaluation selected is a "functional compliance" evaluation 832, which determines the number of required functions in the Business Blueprint Release that are supported by the solutions in each of the Solution Blueprints. Next, in step 835, choose a "dynamic" evaluation to compare the quality of the two Solutions Blueprints. The dynamic evaluation selected is another "performance" evaluation 836, which performs similar calculations as the "performance" evaluation 819 associated with the Business Blueprint Release.

In step 850, create a Deployment Blueprint based on the first Solution Blueprint and request that Blueprint Analyzer create a Deployment Blueprint using the platforms associated with the deployment. Blueprint Analyzer allocates solutions to platforms using a heuristic that matches required operating system and minimizes the number of required connections between computers. In step 851, choose on "static" evaluation to assess blueprint quality by selecting the "required infrastructure" evaluation 852, which performs the calculation based on the solution installation requirements and the platform installation (i.e. infrastructure) resources to determine if resources are sufficient given the allocation of solutions to platforms. Finally, in step 855, save all of the blueprints in the blueprint workspace (sandbox) to local storage as XML file.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention. Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A computer system comprising:
a blueprint analyzer implemented on one or more computer systems, wherein the blueprint analyzer comprises a requirement portfolio server and a blueprint manager component, wherein the blueprint analyzer is configured to:
obtain a first database having requirements, solutions, and deployments, wherein (i) at least one of the requirements comprises functional requirements, data requirements, and event requirements; (ii) at least one of the solutions comprises installation requirements; and (iii) at least one of the deployments comprises sites, milestones, platforms, and infrastructure resources for the deployment;
wherein the requirement portfolio server is configured to retrieve requirements, solutions, and deployments from the portfolio database;
wherein the blueprint manager component is configured to:
create a business blueprint by selecting one or more requirements from the portfolio database and one or more dependencies associated with at least one of the selected requirements from the portfolio database;
create one or more solution blueprints by selecting one or more solutions from the portfolio database to satisfy at least a portion of the selected requirements of the business blueprint and mapping the selected solutions to requirements in the business blueprint, wherein the one or more solutions selected for the solution blueprints comprise at least one solution comprising a set of installation requirements;
create one or more deployment blueprints by selecting one or more deployments from the portfolio database to deploy the selected solutions in the at least one of the solution blueprints, wherein at least one of the deployment blueprints comprise one or more deployment sites, one or more deployment platforms, one or more installation resources, and one or more deployment milestones, wherein at least one of the deployment milestones comprises a date or time when at least one platform will be available in at least one deployment site;
store the business blueprint, the one or more solutions blueprints, and the one or more deployment blueprints in a blueprint database; and
wherein the blueprint analyzer is configured to:
display the business blueprint, at least one of the solution blueprints, and the at least one of the deployment blueprints in a graphical format,
wherein the system further comprises an evaluation engine configured to perform dynamic evaluations that include the evaluation engine performing simulations according to scenario specifications, wherein the dynamic evaluations assess or predict execution properties of a prescribed system, wherein the simulations include varying at least one of frequency, function execution characteristics, and available component resources.

2. The system of claim 1, wherein the blueprint analyzer further comprises an evaluation engine configured to implement:
evaluating by an evaluation engine, the business blueprint, the one or more solution blueprints, and the one or more deployment blueprints against one or more metrics or criteria.

3. The system of claim 1, wherein the blueprint analyzer is configured to implement:
editing and correcting at least one of the business blueprint, one or more of the solution blueprints, and one or more of the deployment blueprints.

4. The system of claim 1, wherein selecting of one or more solutions to satisfy at least a portion of the requirements of the business blueprint is performed automatically by the blueprint manager component by matching the selected requirements against the solutions to determine a best fit for the project or a specific milestone.

5. The system of claim 1, wherein selecting one or more deployments to deploy the selected solutions is performed automatically by the blueprint manager component by matching the solutions to deployments to determine a best fit for the project or a milestone.

6. A computer system comprising:
a requirements database containing one or more requirements comprising functions, data, and events related to the project or a milestone,
wherein functions are grouped into business blueprint components;
  a solutions database containing one or more solutions, wherein the one or more of the solutions are (i) mapped to the functions in the requirements database and (ii) have one or more installation requirements;
  a deployments database containing one or more deployments, wherein deployments are mapped to the functions in the requirements database and wherein deployments comprise deployment platforms having infrastructure resources;
  a graphical user interface coupled to the databases for creating multiple blueprints, wherein blueprints comprise plans, designs, or specifications for evaluating dependencies among requirements, solutions or deployments of the project,
  a blueprint analyzer implemented on one or more computer systems, wherein the blueprint analyzer comprises a requirement portfolio server and a blueprint manager component,
  wherein the requirement portfolio server is configured to retrieve requirements, solutions, and deployments from the portfolio database;
wherein the blueprint manager component is configured to:
  create a business blueprint by selecting one or more requirements from the requirements database, organizing the requirements into business blueprint components, and display graphically one or more dependencies of the functions and business blueprint components;
create one or more solution blueprints by selecting one or more solutions from the solutions database to satisfy at least a portion of the selected requirements of the business blueprint, mapping the selected solutions to requirements in the business blueprint, and displaying graphically whether the selected solutions satisfy the functions of the selected requirements, wherein the one or more solutions selected for the solution blueprints comprise at least one solution comprising a set of installation requirements;
create one or more deployment blueprints by selecting one or more deployments from the deployments database to deploy the selected solutions in the at least one of the solution blueprints, wherein at least one of the deployment blueprints comprises one or more deployment platforms and one or more infrastructure resources associated with at least one of the deployment platforms,
wherein the blueprint analyzer is configured to:
  display graphically whether the infrastructure resources in the selected deployment platforms for at least one of the deployment blueprints have the functionality to fully deploy the installation requirements of the selected solutions for at least one of the solution blueprints; and
a blueprint database operable to store at least one of the blueprints,
wherein the system further comprises an evaluation engine configured to perform dynamic evaluations that include the evaluation engine performing simulations according to scenario specifications, wherein the dynamic evaluations assess or predict execution properties of a prescribed system, wherein the simulations include varying at least one of frequency, function execution characteristics, and available component resources.

7. The system of claim 6, wherein the blueprint analyzer further comprises an evaluation engine configured to implement:
evaluating, by an evaluation engine, at least one of the blueprints against a set of metrics or criteria.

8. The system of claim 6, wherein the blueprint analyzer is configured to implement:
editing at least one of the blueprints.

9. The system of claim 6, wherein the graphical display of whether the infrastructure resources in the selected deployment platforms for the deployment blueprints have the functionality to fully deploy the installation requirements of the selected solutions comprises two or more views, which at least two of the views are at a different levels of detail from one another, wherein at least one of the views is a high-level view, wherein at least one other of the views is at a more detailed level than the high-level view.

10. The system of claim 6, wherein the blueprint analyzer is configured to graphically display whether the requirements and components in the selected solution blueprints have the functionality to implement the requirements and components in the business blueprint, wherein the graphical display of whether the requirements and components in the selected solution blueprints have the functionality to implement the requirements and components in the business blueprint comprises two or more views, which at least two of the views are at a different levels of detail from one another, wherein at least one of the views is a high-level view, wherein at least one other of the views is at a more detailed level than the high-level view.

11. The system of claim 6, wherein the blueprint analyzer is configured to graphically display whether the selected functional requirements, data requirements, and event requirements in the business blueprint are complete, wherein the graphical display of whether the selected functional, functional requirements, data requirements, and event requirements the business blueprint are complete comprises two or more views, which at least two of the views are at a different levels of detail from one another, wherein at least one of the views is a high-level view, wherein at least one other of the views is at a more detailed level than the high-level view.

12. The system of claim 6, wherein creating the one or more deployment blueprints comprises allocating one or more solutions to one or more platforms using a heuristic that matches the infrastructure of solutions in a given solution blueprint to infrastructure available at an associated deployment and captured in a deployment blueprint.

13. The system of claim 6, wherein creating the one or more solution blueprints comprises selecting, by the blueprint manager component, one or more solutions for one or more business blueprint components using a heuristic that matches the functionality and inputs/outputs of solutions in a given solution blueprint to requirements and components in a business blueprint.

14. The method of claim 13, wherein, for at least one of the solution blueprints, at least one solution is automatically selected by the blueprint manager component based on a heuristic that satisfies the at least some of the same requirements as the business blueprint.

15. The system of claim 6, wherein creating the one or more deployment blueprints comprises allocating, by the blueprint manager component, one or more solutions to one or more platforms using a heuristic that matches required operating systems or minimizes the number of required connections between computers.

16. The system of claim 6, wherein creating the one or more deployment blueprints comprises, creating, for a first one of the solution blueprints, two or more different deployment blueprints, wherein each of at least two of the deployment blueprints for the first one of the solution blueprints is based on a different deployment site, wherein the blueprint analyzer is configured to implement selecting at least one of the deployment blueprints for the first one of the solution blueprints.

17. A computer-implemented method comprising:
a) creating, by a blueprint manager component of a blueprint analyzer implemented on one or more computer systems, a business blueprint by selecting one or more requirements pertaining to the project and one or more dependencies associated with at least one of the selected requirements from the portfolio database;
b) creating, by the blueprint manager component, one or more solution blueprints by selecting one or more solutions to satisfy at least a portion of the requirements selected in the business blueprint and mapping the selected solutions to requirements in the business blueprint, wherein the one or more solutions selected for the solution blueprints comprise at least one solution comprising a set of installation requirements;
c) for at least a first one of the solution blueprints, creating, by the blueprint manager component, one or more deployment blueprints by selecting one or more deployments for deploying the solutions selected in the solution blueprint, wherein each of at least one of the deployment blueprints comprises a deployment site, a deployment platform, and one or more installation resources;
d) displaying, by the blueprint analyzer, the business blueprint, the one or more solution blueprints, and the one or more deployment blueprints in a graphical format;
and e) evaluating, by an evaluation engine of the business analyzer, the business blueprint, the one or more solution blueprints, and the one or more deployment blueprints by selecting metrics and criteria to analyze at least one of the blueprints,
wherein evaluating the blueprints comprises assessing or comparing, by the evaluation engine of the business analyzer, the first one of the solution blueprints associated with the one or more deployment blueprints with or to at least one other solution blueprint to determine a best fit or better fit solution blueprint for the business blueprint,
wherein evaluating at least one of the blueprints comprises performing, by an evaluation engine, dynamic evaluations that include the evaluation engine performing simulations according to scenario specifications, wherein the dynamic evaluations assess or predict execution properties of a prescribed system, wherein the simulations include varying at least one of frequency, function execution characteristics, and available component resources,
wherein the dynamic evaluations by the evaluation engine comprise a performance evaluation of the business blueprint, wherein the dynamic evaluation comprises a simulation in which at least one scenario is executed at selected frequencies, and wherein the computer system determines one or more latency and utilization statistics for the business blueprint for one or more scenarios, functions, or components.

18. The method of claim 17, wherein the metrics and criteria to be selected are related to solutions.

19. The method of claim 17, wherein the metrics and criteria to be selected are related to deployments.

20. The method of claim 17, wherein the best fit or better fit solution blueprint is determined based at least partially on (i) the extent to which one or more solutions associated with the solution blueprints satisfy the requirements of the business blueprint; and (ii) the extent to which the inputs and outputs of solution components associated with the solution blueprints match the input and outputs of the business blueprint.

21. The method of claim 17, wherein the assessment or comparison of the solution blueprints comprises a static evaluation by an evaluation engine, wherein the static evaluation comprises a functional compliance evaluation of at least one of the solution blueprints, wherein the functional compliance evaluation comprises determining, by the evaluation engine, for at least two of the solution blueprints, the number of required functions in the business blueprint that are supported by the solution.

22. The method of claim 17, wherein the assessment or comparison of the solution blueprints comprises a dynamic evaluation by the evaluation engine, wherein the dynamic evaluation comprises a performance evaluation of at least one of the solution blueprints, wherein the dynamic evaluation comprises performing, by the evaluation engine, a simulation in which at least one scenario is executed at selected frequencies, and wherein one or more latency and utilization statistics are determined for the solution blueprint for one or more scenarios, functions, or components.

23. A computer system, comprising:
a requirements database containing one or more requirements, wherein at least one of the requirements has dependencies with one or more other requirements;
a solutions database containing one or more solutions,
wherein the one or more solutions are mapped to the one or more requirements of the requirements database, and
wherein the one or more solutions have installation requirements related to the installation of the solution;
a deployments database containing one or more deployments,
wherein the one or more deployments are mapped to requirements in the requirements database, and
wherein deployments comprise deployment platforms having infrastructure resources;
a graphical user interface coupled to the deployment database, the solutions database and the deployments database;
a blueprint analyzer implemented on one or more computer systems, wherein the blueprint analyzer comprises a blueprint manager component, wherein the blueprint manager component is configured to:

create a business blueprint by selecting one or more requirements from the requirements database and cause the mapping of at least one dependency of the requirements;

create one or more solutions blueprints by selecting one or more solutions from the solutions database to satisfy at least a portion of the selected requirements of the business blueprint and cause the mapping of the selected solutions to the requirements based on whether the solutions satisfy the requirements, wherein the one or more solutions selected for the solution blueprints comprise at least one solution comprising a set of installation requirements; and for at least a first one of the solution blueprints, create one or more deployment blueprints by selecting one or more deployments from the deployments database to deploy the selected solutions in at least one of the solution blueprints and cause the mapping of the selected deployments to the solutions based on whether the deployments can deploy the solutions, wherein each of at least one of the deployment blueprints comprises a deployment site, a deployment platform, and one or more installation resources;

wherein the blueprint analyzer is configured to:

graphically display one or more evaluations of one or more of the blueprints, wherein the graphical display comprises at least two views of at least one evaluation of at least one of the blueprints, which at least two of the views are at a different levels of detail from one another, wherein the system further comprises an evaluation engine configured to perform dynamic evaluations that include the evaluation engine performing simulations according to scenario specifications, wherein the dynamic evaluations assess or predict execution properties of a prescribed system, wherein the simulations include varying at least one of frequency, function execution characteristics, and available component resources.

24. The system of claim 23, wherein at least one of the views is a high-level view, wherein at least one other of the views is at a more detailed level than the high-level view.

25. The system of claim 24, wherein at least one of the high-level views of the one of more evaluations comprises a pie chart.

26. The system of claim 23, wherein at least one of the views of the one or more evaluations comprises a box-and-line node-edge drawing.

* * * * *